US012509242B1

(12) United States Patent
Rahman et al.

(10) Patent No.: US 12,509,242 B1
(45) Date of Patent: Dec. 30, 2025

(54) SYSTEMS AND METHODS FOR CONTROL AND INTRUSION DETECTION IN UNMANNED AERIAL VEHICLES

(71) Applicants: Mohammad Ashiqur Rahman, Miami, FL (US); Kemal Akkaya, Miami, FL (US); Muneeba Asif, Miami, FL (US)

(72) Inventors: Mohammad Ashiqur Rahman, Miami, FL (US); Kemal Akkaya, Miami, FL (US); Muneeba Asif, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/255,063

(22) Filed: Jun. 30, 2025

(51) Int. Cl.
*B64D 45/00* (2006.01)
*B64U 10/10* (2023.01)
*B64U 101/15* (2023.01)

(52) U.S. Cl.
CPC .......... *B64D 45/0015* (2013.01); *B64U 10/10* (2023.01); *B64U 2101/15* (2023.01); *B64U 2201/10* (2023.01)

(58) Field of Classification Search
CPC B64D 45/0015; B64U 10/10; B64U 2101/15; B64U 2201/10
See application file for complete search history.

(56) References Cited

U.S. PATENT DOCUMENTS

2019/0385057 A1* 12/2019 Litichever ................ G06N 3/08

* cited by examiner

*Primary Examiner* — Joan T Goodbody
*Assistant Examiner* — Godfrey Aleksander Maciorowski
(74) *Attorney, Agent, or Firm* — SALIWANCHIK, LLOYD & EISENSCHENK

(57) ABSTRACT

Systems and methods are provided for control and intrusion detection in unmanned aerial vehicles (UAVs). Pulse width modulation (PWM) signals can be used as both control indicators and a basis for intrusion detection. PWM signals can be monitored to detect irregularities that may signify potential intrusions, capitalizing on the predictable nature of PWM signal patterns under normal operating conditions, where deviations can indicate an attack. By analyzing these variations in real time, anomalies can be detected to prevent or inhibit further compromising of the UAV hardware. Also, PWM data can be fused with control inputs to enhance system responsiveness, creating a robust, adaptive intrusion detection system that maintains UAV hardware integrity and safeguards mission-critical functions even in adversarial environments.

20 Claims, 40 Drawing Sheets

```
uint16_t MixingOutput::output_limit_calc_single(int i, float value) const
{
    // check for invalid / disabled channels
    if (!PX4_ISFINITE(value)) {
        return _disarmed_value[i];
    } if (_reverse_output_mask & (1 << i)) {
        value = -1.f * value;
    } uint16_t effective_output = value * (_max_value[i] - _min_value[i]) / 2
        + (_max_value[i] + _min_value[i]) / 2;

// last line of defense against invalid inputs
    return math::constrain(effective_output, _min_value[i], _max_value[i]);
}
```

FIG. 17

| Work | Defense Technique | Layer Targeted | Attacks Considered | Control Aware? |
|---|---|---|---|---|
| [21] | Game Theory | Sensor | DoS, Sybil, false alarm | ✗ |
| [22] | | Sensor | GPS spoofing | ✗ |
| [23] | | Network | DoS, Sybil, false alarm | ✗ |
| [24] | Blockchain | Network | DoS, Remote to User, User to Remote, probing | ✗ |
| [25] | Spectral Traffic Analysis | Network | DDoS | ✗ |
| [26] | AI/ Machine Learning/ Deep Learning | Network | SYN-flood, de-authentication | ✗ |
| [27] | | Network | Eavesdropping, sniffing, buffer overflow | ✗ |
| [28] | | Network | DoS, Remote to User, User to Remote, probing | ✗ |
| [29] | | Hardware | GPS Spoofing, GPS Jamming | ✗ |
| [15] | | Hardware | GPS Spoofing, Transduction | ✓ |
| [30] | Behavior Rules | Network | Resource depletion, capturing, data corruption | ✗ |
| [31] | | Network | Physical Invariants | ✗ |
| [32] | | Network | Misbehavior | ✗ |
| [33] | Artificial Immune System (AIS) | Network | Blackhole, sybil, flooding | ✗ |
| [34] | Hybrid | Network | Replay, MiTM, impersonation | ✗ |
| ConFIDe | Machine Learning | Hardware | Hardware Trojan, PWM manipulation | ✓ |

FIG. 23

| No. of channels attacked | Channels | Accuracy | F1-Score | ROC-AUC score | Precision | Recall |
|---|---|---|---|---|---|---|
| 4 | 1234 | 0.925 | 0.949 | 0.927 | 0.975 | 0.924 |
| 3 | 123 | 0.909 | 0.938 | 0.893 | 0.953 | 0.924 |
| | 124 | 0.899 | 0.933 | 0.875 | 0.941 | 0.923 |
| | 134 | 0.932 | 0.953 | 0.939 | 0.984 | 0.924 |
| | 234 | 0.933 | 0.954 | 0.941 | 0.985 | 0.924 |
| 2 | 12 | 0.783 | 0.864 | 0.641 | 0.812 | 0.924 |
| | 13 | 0.904 | 0.935 | 0.885 | 0.947 | 0.924 |
| | 14 | 0.905 | 0.936 | 0.887 | 0.948 | 0.924 |
| | 23 | 0.905 | 0.936 | 0.886 | 0.948 | 0.924 |
| | 24 | 0.896 | 0.930 | 0.868 | 0.936 | 0.924 |
| | 34 | 0.931 | 0.953 | 0.934 | 0.983 | 0.924 |
| 1 | 1 | 0.836 | 0.894 | 0.747 | 0.866 | 0.924 |
| | 2 | 0.822 | 0.886 | 0.719 | 0.851 | 0.924 |
| | 3 | 0.905 | 0.936 | 0.886 | 0.949 | 0.924 |
| | 4 | 0.889 | 0.926 | 0.855 | 0.928 | 0.924 |

FIG. 24

| Metric | Small Deviation | Medium | Large |
|---|---|---|---|
| Accuracy | 0.9972 | 0.9993 | 1.0 |
| F1 Score | 0.9986 | 0.9995 | 1.0 |
| ROC AUC | 0.9986 | 0.9995 | 1.0 |
| Precision | 1.0 | 1.0 | 1.0 |

FIG. 25

| No. | Feature Name | Description |
|---|---|---|
| 1 | control[0] | Control signal for channel 1 |
| 2 | control[1] | Control signal for channel 2 |
| 3 | control[2] | Control signal for channel 3 |
| 4 | control[3] | Control signal for channel 4 |
| 5 | pos_horiz_accuracy | Horizontal position accuracy |
| 6 | pos_vert_accuracy | Vertical position accuracy |
| 7 | mag_test_ratio | Magnetic data test ratio |
| 8 | vel_test_ratio | Velocity data test ratio |
| 9 | pos_test_ratio | Positional data test ratio |
| 10 | hgt_test_ratio | Height data test ratio |
| 11 | lat | Latitude position |
| 12 | lon | Longitude position |
| 13 | alt | Altitude |
| 14 | x | Linear x-position |
| 15 | y | Linear y-position |
| 16 | z | Linear z-position |
| 17 | yaw | Drone's orientation |
| 18 | pwm[0] | PWM signal for channel 1 |
| 19 | pwm[1] | PWM signal for channel 2 |
| 20 | pwm[2] | PWM signal for channel 3 |
| 21 | pwm[3] | PWM signal for channel 4 |
| 22 | yawspeed | Yaw speed of drone |
| 23 | q[0] | Quaternion component 1 |
| 24 | q[1] | Quaternion component 2 |
| 25 | q[2] | Quaternion component 3 |
| 26 | q[3] | Quaternion component 4 |
| 27 | roll_body | Drone's body roll orientation |
| 28 | pitch_body | Drone's body pitch orientation |
| 29 | yaw_body | Drone's body yaw orientation |
| 30 | thrust_body[2] | Thrust related to body frame |
| 31 | roll | Global roll orientation |
| 32 | pitch | Global pitch orientation |
| 33 | yaw | Global yaw orientation |
| 34 | eph | Positional error in horizontal |
| 35 | epv | Positional error in vertical |
| 36 | output[0] | Output signal 1 |
| 37 | output[1] | Output signal 2 |
| 38 | output[2] | Output signal 3 |
| 39 | output[3] | Output signal 4 |

FIG. 26

Algorithm 1: Synthetic Attack Sample Generation

Input: BenignData, Trigger
  Result: BenignData$_{Inverted}$
  $X \leftarrow$ Trigger
  for *every $\frac{X}{100}$ sample in BenignData* do
      $PWM_{Inverted} = abs(2500\mu s - sample.PWM)$
      sample.PWM $\leftarrow PWM_{Inverted}$ end
      for *sample in BenignData* do
          if *sample.PWM < 1100µs* then
              sample.PWM = 1100µs
          end
          if *sample.PWM > 1900µs* then
              sample.PWM = 1900µs
          end
      end
      return BenignData;

FIG. 27

Algorithm 2: Firmware Modification Attack

Input: outputs[MAX_ACTUATORS], num_outputs
Output: inverted_outputs[MAX_ACTUATORS]
for $i = 0$ to $num\_outputs - 1$ do
    function = _mixing_output.outputFunction(i)
    is_reversible = reversible_outputs & (1u << i)
    output = outputs[i]
    if $((int)function \geq (int)OutputFunction::Motor1)$ &&
      $((int)function \leq (int)OutputFunction::MotorMax)$ &&
      !is_reversible then
        if $function == OutputFunction::Motor1 \;||\; function ==$
          $OutputFunction::Motor2$ then
            output = (output - PWM_SIM_PWM_MIN_MAGIC) /
            (PWM_SIM_PWM_MAX_MAGIC -
            PWM_SIM_PWM_MIN_MAGIC)
        end
    end
    inverted_outputs[i] = output
end

FIG. 28

SYSTEMS AND METHODS FOR CONTROL AND INTRUSION DETECTION IN UNMANNED AERIAL VEHICLES

GOVERNMENT SUPPORT

This invention was made with government support under H98230-22-1-0327 awarded by the Department of Defense. The government has certain rights in the invention.

BACKGROUND

The unmanned aerial vehicle (UAV) industry has experienced exponential growth, and by 2031, the global UAV market is projected to rise to $97.65 billion. UAVs are integral in varied applications such as surveillance for smart grids, crowd analysis, disaster monitoring, urban monitoring, agriculture, remote sensing, logistics, and defense sectors. To proficiently handle these tasks, UAVs must ensure end-to-end security and resiliency without sacrificing safety.

BRIEF SUMMARY

Embodiments of the subject invention provide novel and advantageous systems and methods for control and intrusion detection in unmanned aerial vehicles (UAVs). Pulse width modulation (PWM) signals can be used as both control indicators and a basis for intrusion detection. In systems and methods of embodiments of the subject invention, PWM signals can be monitored to detect irregularities that may signify potential intrusions. This capitalizes on the predictable nature of PWM signal patterns under normal operating conditions, where deviations can indicate an attack. By analyzing these variations in real time, anomalies can be detected to prevent or inhibit further compromising of the UAV hardware. Also, PWM data can be fused with control inputs to enhance system responsiveness, creating a robust, adaptive intrusion detection system (IDS) that maintains UAV hardware integrity and safeguards mission-critical functions even in adversarial environments.

In an embodiment, a system for control and/or intrusion detection in UAV can comprise: a processor in operable communication with the UAV; and a machine-readable medium in operable communication with the processor and having instructions stored thereon that, when executed by the processor, perform the following steps: i) receiving flight data of the UAV (e.g., trajectory, destination, ground station control log data, etc.); ii) mapping expected PWM signals based on the flight data; iii) training a model using the expected PWM signals to generate an error threshold; iv) receiving PWM data of the UAV (e.g., during flight of the UAV); v) comparing the PWM data of the UAV to the expected PWM signals; vi) upon a difference between the PWM data and the expected PWM signals being less than or equal to the error threshold, allowing the UAV to continue its normal operation; and vii) upon a difference between the PWM data and the expected PWM signals being greater than the error threshold, determining that the UAV is under attack and causing the UAV to take corrective action (e.g., shutting down the UAV, causing the UAV to return to its launch point, redirecting the UAV on a new path/trajectory, etc.). Step iii) can comprise using a neural network-based autoencoder (AE). The neural network-based AE can comprise an encoder network and a decoder network, the encoder network can be configured to map an input to a feature representation, and/or the decoder network can be configured to reconstruct the input from the feature representation. Step ii) can comprise using a regressor (e.g., a multi-output Keras regressor). The regressor can comprise a plurality of flight control inputs (e.g., 33 or at least 33 flight control inputs) and a plurality of hidden layers (e.g., five or at least five hidden layers), and the regressor can be configured to predict expected PWM signals from a plurality of outputs of the UAV (e.g., four or at least four outputs of the UAV). The system can be configured to successfully detect a jamming attack, a replay attack, a malware or firmware attack, an electromagnetic interference attack, a global positioning satellite (GPS) spoofing attack, and/or a physical tampering attack. The instructions when executed can further perform the following: i-a) after receiving the flight data of the UAV and before mapping the expected PWM signals, pre-processing the flight data (e.g., interpolation and/or scaling of the flight data); and step ii) can comprise mapping the expected PWM signals based on the pre-processed flight data. The system can further comprise the UAV. The processor and/or the machine-readable medium can be disposed on the UAV (e.g., on an integrated circuit (IC) and/or on a field programmable gate array (FPGA)), though embodiments are not limited thereto. The instructions when executed can further perform the following: receiving sensor data of the UAV and/or flight control data of the UAV; and comparing the PWM data to the sensor data and/or the flight control data.

In another embodiment, a method for control and/or intrusion detection in UAV can comprise: i) receiving (e.g., by a processor) flight data of the UAV (e.g., trajectory, destination, ground station control log data, etc.); ii) mapping (e.g., by the processor) expected PWM signals based on the flight data; iii) training (e.g., by the processor) a model using the expected PWM signals to generate an error threshold; iv) receiving (e.g., by the processor) PWM data of the UAV (e.g., during flight of the UAV); v) comparing (e.g., by the processor) the PWM data of the UAV to the expected PWM signals; vi) upon a difference between the PWM data and the expected PWM signals being less than or equal to the error threshold, allowing (e.g., by the processor) the UAV to continue its normal operation; and vii) upon a difference between the PWM data and the expected PWM signals being greater than the error threshold, determining (e.g., by the processor) that the UAV is under attack and causing (e.g., by the processor) the UAV to take corrective action (e.g., shutting down the UAV, causing the UAV to return to its launch point, redirecting the UAV on a new path/trajectory, etc.). Step iii) can comprise using a neural network-based AE. The neural network-based AE can comprise an encoder network and a decoder network, the encoder network can be configured to map an input to a feature representation, and/or the decoder network can be configured to reconstruct the input from the feature representation. Step ii) can comprise using a regressor (e.g., a multi-output Keras regressor). The regressor can comprise a plurality of flight control inputs (e.g., 33 or at least 33 flight control inputs) and a plurality of hidden layers (e.g., five or at least five hidden layers), and the regressor can be configured to predict expected PWM signals from a plurality of outputs of the UAV (e.g., four or at least four outputs of the UAV). The method can successfully detect a jamming attack, a replay attack, a malware or firmware attack, an electromagnetic interference attack, a GPS spoofing attack, and/or a physical tampering attack. The method can further comprise: i-a) after receiving the flight data of the UAV and before mapping the expected PWM signals, pre-processing (e.g., by the processor) the flight data (e.g., interpolation and/or scaling of the flight data); and step ii) can comprise mapping the expected PWM signals based on the pre-processed flight data. The processor and/or a machine-readable medium (in operable communication with the processor) can be disposed on the UAV (e.g., on an IC and/or an FPGA), though embodiments are not limited thereto. The method can further comprise: receiving sensor data of the UAV and/or flight control data of the UAV; and comparing the PWM data to the sensor data and/or the flight control data.

BRIEF DESCRIPTION OF DRAWINGS

FIG. 5A shows a plot of duty cycle amplitude (in Volts (V)) versus samples per duty cycle width (in seconds(s)), showing PWM signals with minor differences in attacked waveforms. FIG. 5B shows a plot of altitude (above mean sea level (AMSL)) versus latitude and longitude, showing a UAV mission (completed without detecting the attack). FIG. 5C shows a plot of duty cycle (in microseconds (μs)) versus samples. FIG. 5D shows a plot of angular velocity (in meters per second (m/s)) versus samples, showing that attack introduces noise, increasing system vibration.

FIG. 6A shows plots of angle (in degrees) versus time for roll (top), pitch (middle), and yaw (bottom), showing that altering the duty cycle value by 500 units allowed the mission to proceed with increased system vibration. FIG. 6B shows plots of angle (in degrees) versus time for roll (top), pitch (middle), and yaw (bottom), showing that altering the duty cycle value by 525 units resulted in a UAV crash.

FIG. 12A shows the ROC-AUC score of all the models when all four channels are under a PWM-manipulative hardware Trojan attack. FIG. 12B shows the ROC-AUC score of all the models when are under a PWM-manipulative hardware Trojan attack. FIG. 12C shows the ROC-AUC score of all the models when only one channel is under a PWM-manipulative hardware Trojan attack. The attack selectively alters the duty cycle of the PWM signals sent to the motors. The system according to an embodiment of the subject invention outperformed all the other models.

FIG. 17 shows a snippet of the output constraint calculation function illustrating the method used to limit and calculate the effective output for a given channel.

FIGS. 18A and 18B show polygonal paths; FIG. 18C shows complex route with varied altitudes/speeds; FIG. 18D shows a survey path.

FIG. 23 shows a table of characteristics of related art systems and methods, as well as those of systems and methods of embodiments of the subject invention. The row labeled "ConFIDe" is for systems and methods of embodiments of the subject invention. The row labeled "[21]" is for Sun et al. (An intrusion detection based on Bayesian game theory for UAV network, In Proceedings of the 11th EAI International Conference on Mobile Multimedia Communications, MOBIMEDIA'18, page 56-67, Brussels, BEL, 2018, ICST (Institute for Computer Sciences, Social-Informatics and Telecommunications Engineering)); the row labeled "[22]" is for Eldosouky et al. (Drones in distress: A game-theoretic countermeasure for protecting UAVS against GPS spoofing, IEEE Internet of Things Journal, 7(4):2840-2854, 2020); the row labeled "[23]" is for Sedjelmaci et al. (Toward a lightweight and efficient UAV-aided vanet, Transactions on Emerging Telecommunications Technologies, 30:e3520, August 2019); the row labeled "[24]" is for Khan et al. (A blockchain-based decentralized machine learning framework for collaborative intrusion detection within UAVs, Computer Networks, 196:108217, 2021); the row labeled "[25]" is for Condomines et al. (Network intrusion detection system for UAV ad-hoc communication: From methodology design to real test validation. Ad Hoc Networks, 90:101759, 2019, Recent advances on security and privacy in Intelligent Transportation Systems); the row labeled "[26]" is for Basan et al. (Intelligent intrusion detection system for a group of UAVs, In Ying Tan and Yuhui Shi, editors, Advances in Swarm Intelligence, pages 230-240, Cham, 2021, Springer International Publishing); the row labeled "[27]" is for Al-Haija and Al Badawi (High-performance intrusion detection system for networked UAVs via deep learning—neural computing and applications, link.springer.com/article/10.1007/s00521-022-07015-9, February 2022); the row labeled "[28]" is for Praveena et al. (Optimal deep reinforcement learning for intrusion detection in UAVs, Computers, Materials and Continua, 70:2639-2653, September 2021); the row labeled "[29]" is for Whelan et al. (Artificial intelligence for intrusion detection systems in unmanned aerial vehicles, Computers and Electrical Engineering, 99:107784, 2022); the row labeled "[22]" is for Dash et al. (Pid-piper: Recovering robotic vehicles from physical attacks, In 2021 51$^{st}$ Annual IEEE/IFIP International Conference on Dependable Systems and Networks (DSN), pages 26-38, IEEE, 2021); the row labeled "[30]" is for Mitchell and Chen (Adaptive intrusion detection of malicious unmanned air vehicles using behavior rule specifications, IEEE transactions on systems, man, and cybernetics: systems, 44(5):593-604, 2013); the row labeled "[31]" is for Quinonez et al. (Savior: Securing autonomous vehicles with robust physical invariants, In Usenix Security, 2020); the row labeled "[32]" is for Kwon et al. (Real-time safety assessment of unmanned aircraft systems against stealthy cyber attacks, Journal of Aerospace Information Systems, 13(1):27-45, 2016); the row labeled "[33]" is for Fotohi et al. (A self-adaptive intrusion detection system for securing UAV-to-UAV communications based on the human immune system in UAV networks, Journal of Grid Computing, 20(3):1-26, 2022); and the row labeled "[34]" is for Kumar et al. (Blockchain and deep learning empowered secure data sharing framework for softwarized UAVs, In 2022 IEEE International Conference on Communications Workshops (ICC Workshops), pages 770-775, 2022). All 15 references listed in the previous sentence are hereby incorporated by reference herein in their entireties.

FIG. 24 shows a table of performance metrics evaluated on different combinations of channels attacked.

FIG. 25 shows a table of performance in detecting GPS spoofing attacks.

FIG. 26 shows a table of features and their descriptions for Confide.

FIG. 27 shows an algorithm for synthetic attack sample generation.

FIG. 28 shows an algorithm for a firmware modification attack.

DETAILED DESCRIPTION

Figure 1:
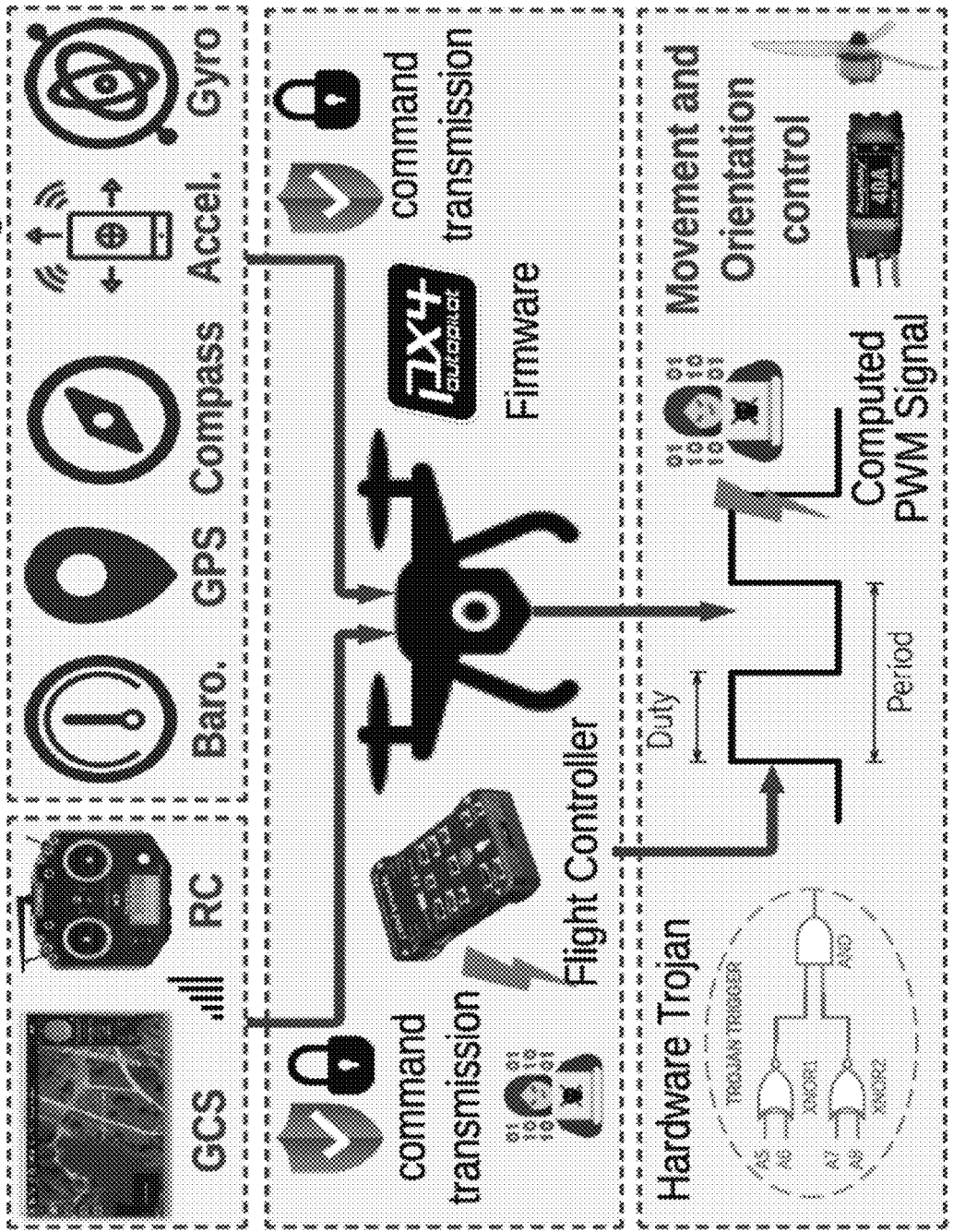
FIG. 1 shows a sensor-control-actuation working principle in unmanned aerial vehicles (UAVs), and potential attack vectors. The two lightning bolts show vulnerabilities like pulse width modulation (PWM) manipulations and hardware attacks, while the two checkmarks shows existing security solutions for sensor command data in UAVs.

Embodiments of the subject invention provide novel and advantageous systems and methods for control and intrusion detection in unmanned aerial vehicles (UAVs). Pulse width modulation (PWM) signals can be used as both control indicators and a basis for intrusion detection. In systems and methods of embodiments of the subject invention (which can be referred to herein as "Confide" or "ConFIDe"), PWM signals can be monitored to detect irregularities that may signify potential intrusions. This capitalizes on the predictable nature of PWM signal patterns under normal operating conditions, where deviations can indicate an attack. By analyzing these variations in real time, ConFIDe can detect anomalies to prevent or inhibit further compromising of the UAV hardware. Also, PWM data can be fused with control inputs to enhance system responsiveness, creating a robust, adaptive intrusion detection system (IDS) that maintains UAV hardware integrity and safeguards mission-critical functions even in adversarial environments. The effectiveness of ConFIDe has been validated through rigorous testing, demonstrating its ability to enhance UAV security across diverse applications.

UAVs are increasingly susceptible to cyber and hardware attacks due to their reliance on electronic systems and open communication channels. Related art IDSs do not consider control signal integrity, leaving UAVs vulnerable to sophisticated hardware-based attacks that can compromise mission success. ConFIDe provides a PWM-driven control-fused IDS that addresses this gap by utilizing PWM signals as both control indicators and a basis for intrusion detection.

UAVs typically operate on a sensor-controller-actuator cycle, where a proportional-integral-derivative (PID) controller uses PWM signals to manage orientation and movement. However, these PWM signals are susceptible to manipulation through attacks like electromagnetic interference (EMI) and hardware Trojans, which can induce unauthorized maneuvers or crashes. Related art IDSs do not consider these control-layer vulnerabilities, focusing primarily on sensor data. ConFIDe addresses this gap by monitoring PWM signal patterns to detect malicious alterations. By validating the correlation between PWM signals and sensor/controller data, ConFIDe can strengthen UAV defenses against subtle hardware exploits. Tested on a PX4 UAV across various PWM alteration attack scenarios, including hardware Trojans and global position satellite (GPS) spoofing, ConFIDe achieved high detection accuracy, enhancing UAV resilience against control-based intrusions (see Examples 2-11).

Related art IDSs for UA Vs are typically limited to monitoring sensor data, leaving critical control components like PWM signals vulnerable to exploitation. ConFIDe addresses this gap by focusing on PWM signals, which are integral to UAV control and susceptible to attacks that may lead to unauthorized adjustments or crashes. Unlike related art systems, ConFIDe's control-fusion design can continuously cross-verify PWM patterns with sensor and control data, allowing detection of subtle alterations indicative of hardware-level threats. Unlike related art approaches, ConFIDe can detect subtle manipulation in real-time, enhancing UAV resilience against both obvious and covert hardware-based attacks, including hardware Trojans and GPS spoofing. The control-fusion approach ensures that any deviations in PWM patterns are identified quickly, thereby safeguarding UAVs in dynamic, high-risk environments. This integrated detection mechanism offers a robust, adaptive solution that is particularly valuable in scenarios where UAVs must maintain high reliability and security standards under adversarial conditions.

Embodiments of the subject invention provide a control-fused approach to UAV security by monitoring and validating PWM signals, which control UAV orientation and movement, as a basis for intrusion detection. UAVs traditionally follow a sensor-controller-actuator loop, where sensors gather data, controllers process the data, and actuators implement the commands via PWM signals. However, PWM signals are susceptible to manipulation by adversaries through methods such as intentional electromagnetic interference (IEMI) or hardware Trojans embedded in untrusted supply chains. Such manipulations bypass related art IDSs that primarily monitor sensor data, leaving UAVs vulnerable to unauthorized maneuvers and potential crashes.

ConFIDe can analyze deviations in PWM patterns relative to expected control behavior, detecting anomalies that may signify an intrusion. ConFIDe can integrate real-time monitoring of the PWM signals with cross-validation against sensor data, allowing for immediate response (e.g., in less than 0.5 seconds) to suspicious activity. The PWM validation layer strengthens the IDS, enabling the UAV to distinguish between benign deviations and deliberate alterations to control signals. This setup ensures that any unanticipated changes in PWM signals—often indicative of underlying hardware exploits—can be flagged and responded to before they can compromise UAV stability or mission objectives.

With the rise in the application of UAVs, security concerns associated with them have become paramount. Similar to other cyber-physical systems, the primary working principle behind UAVs follows the sensor-controller-actuation cycle. Errors between the setpoints and sensor data are computed through a PID controller and translated to PWM signals that control the orientation and movement of the UAV. IEMI-based alteration of PWM signals can cause unauthorized maneuvers and crashes in UAVs, and PWM alteration attacks can be carried out in various ways. For instance, hardware Trojans (HTs) can manipulate the PWM signals, and given the untrusted supply chain, HTs are a critical threat. Adversaries can exploit the PWM signals to manipulate UAV operations subtly, bypassing related art IDSs that only monitor sensor data. Therefore, ensuring the integrity of PWM signals and their correlation with sensor and controller data is crucial for end-to-end UAV security. ConFIDe verifies the integrity of the flight controller-generated PWM signals, ensuring the motors receive the signals free from hidden exploits.

UAVs are integral in varied applications such as surveillance for smart grids, crowd analysis, disaster monitoring, urban monitoring, agriculture, remote sensing, logistics, and defense sectors. To proficiently handle these tasks, UAVs must ensure end-to-end security and resiliency without sacrificing safety. As shown in FIG. 1, the working principle of a UAV follows the sensor-control-actuation technique. Initially, UAVs receive navigation targets or setpoints via inputs from radio controls or ground control stations. The onboard sensors then gather real-time data, which is essential for the PID controller. This controller evaluates the position and attitude errors between the actual sensor readings and the predefined setpoints. It then computes a control value to rectify these errors. Subsequently, the flight controller interprets this control value to generate PWM or actuation signals (the terms "PWM signals" and "actuation signals" can be used interchangeably herein). These signals are essential in regulating the power supply to the UAV's motors, thereby controlling its orientation, direction, and speed. This working mechanism exposes UAVs to various cyber-physical attack vectors.

Given the complex and globally-distributed supply chain of UAV components, manufacturing the flight controllers often involves multiple outsourced entities. This raises the potential for HT insertion, which can be selectively triggered to alter the PWM signals as per their payload. As the PWM signals govern the overall movement and orientation in UAVs, their adversarial alteration can result in significant deviations from intended UAV behavior, from subtle changes in the desired trajectory to complete operational failures. Modern HTs are no longer simple, always-active threats that can be easily identified during routine test flights or through basic operational checks. Instead, these Trojans can be intricately designed to remain dormant, undetectable through conventional means, and activated only under highly specific conditions that may not be replicated in standard testing environments. Trojans can be designed to remain dormant until triggered by specific conditions, such as altitude, geographic location, or even specific payloads, making their existence and activation far from straightforward. This sophistication facilitates the Trojans to remain undetected during routine test flights or inspections. For instance, activation could depend on a particular sequence of commands, specific geographic locations, altitudes, or even the UAV's interaction with certain wireless signals. This specificity ensures that the Trojan remains dormant during the test flight phase, thus bypassing detection mechanisms that do not replicate these unique conditions.

To overcome these challenges, ConFIDe is specifically designed to secure the end-to-end process of UAV flight control. ConFIDe can employ deep learning techniques to analyze the relationship between the sensing, controlling, and the subsequent generation of PWM signals. It effectively detects a wide spectrum of attacks ranging from GPS spoofing and jamming to intrusions in sensor and controller systems and, crucially, in the PWM signals. By employing a holistic approach that utilizes a deep learning-based autoencoder (AE) for one-class classification, it can verify the integrity of PWM signals before sending them to the motors, ensuring the UAVs are secured against any tampering. ConFIDe can ensure that any discrepancy originating from either false data injection (FDI) attacks or direct hardware interventions is detected based on the resultant PWM signals. The table in FIG. 23 shows a comparison between ConFIDe and related art systems and methods.

Figure 2:
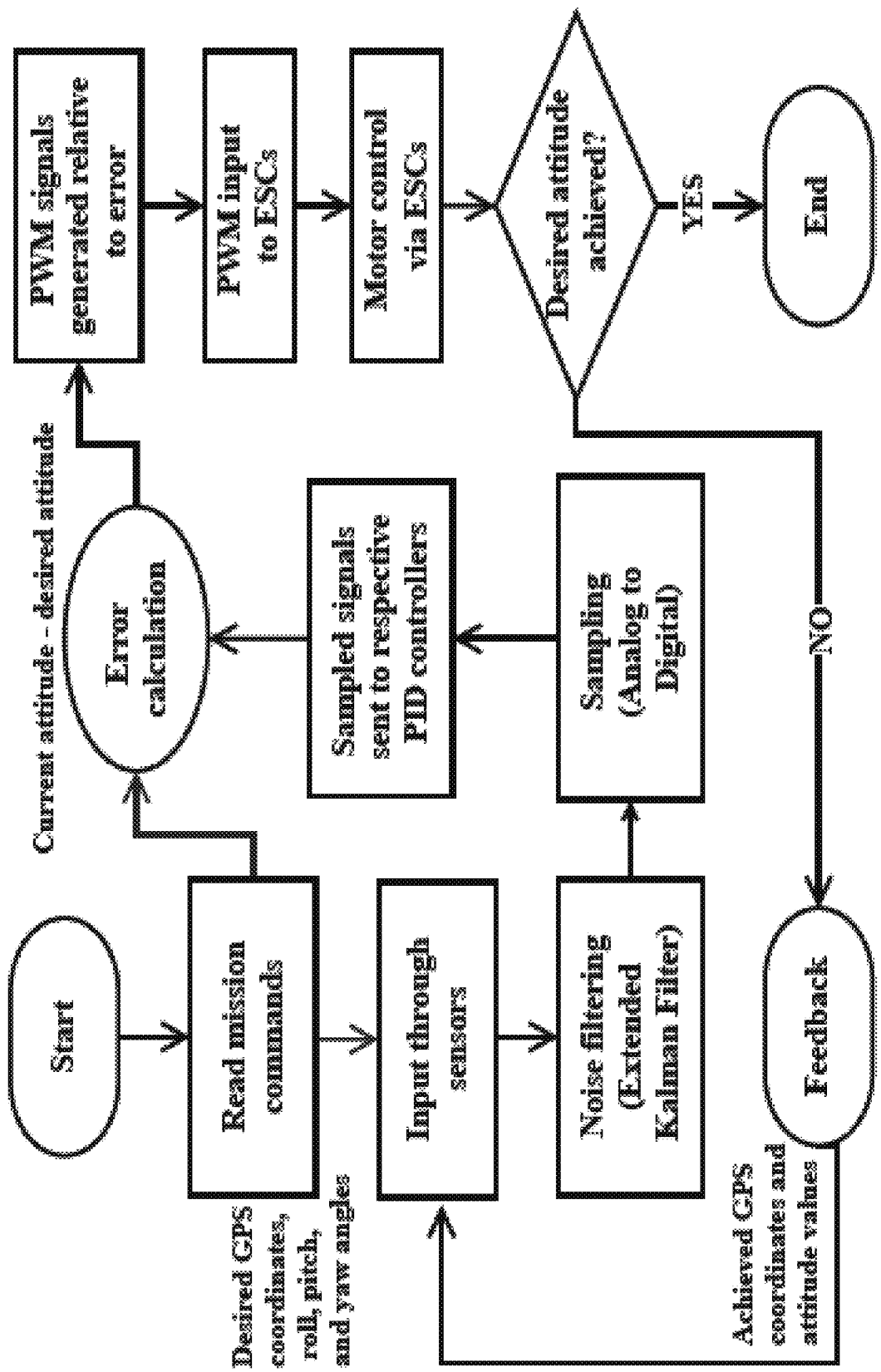
FIG. 2 shows a flow diagram of the typical workflow of a UAV. The flight controller receives input commands, processes them through its firmware, and produces PWM values to drive the motor, directing motion.
Figure 3:
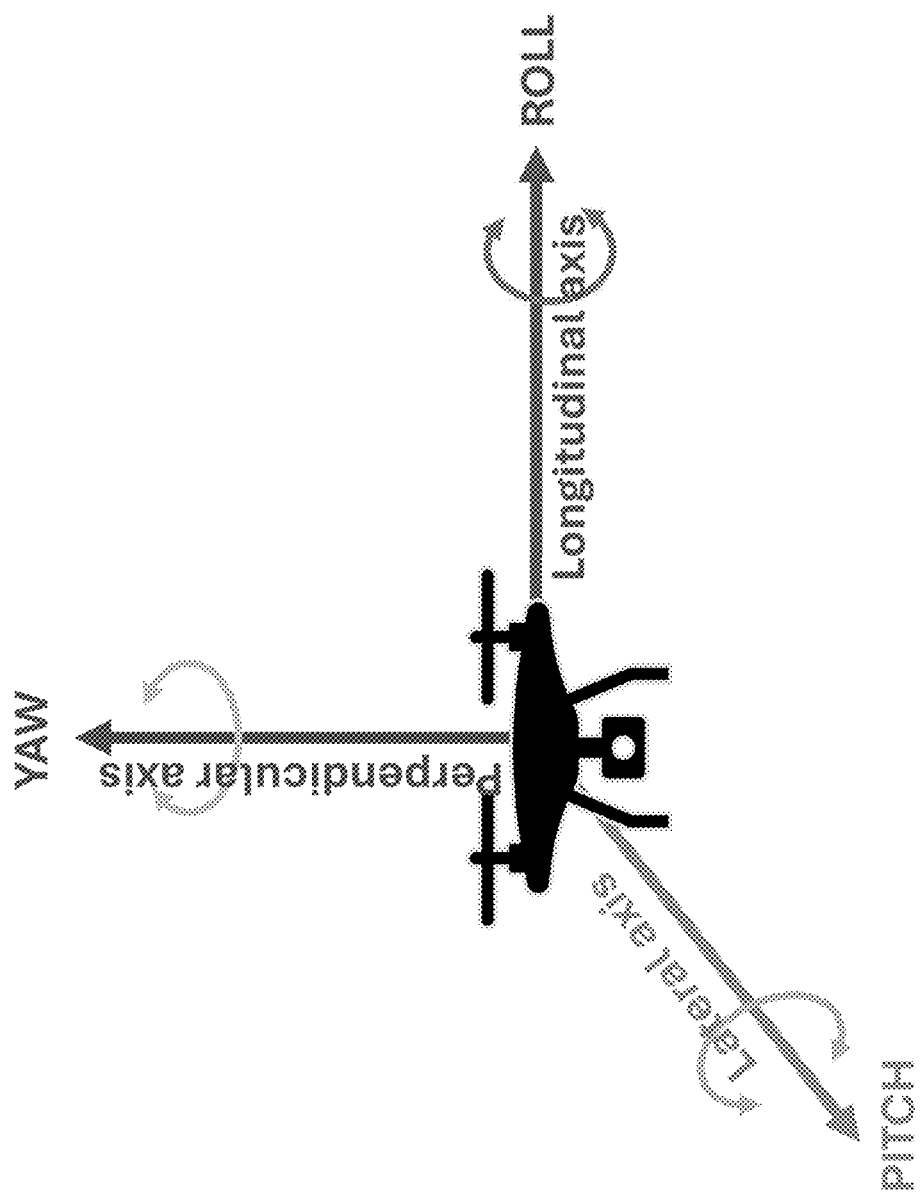
FIG. 3 shows an illustration of the roll, pitch, and yaw axes of a UAV for orientation and movement control and clockwise (CW) and counter-clockwise (CCW) motors in a quadcopter UAV.

A UAV's control and monitoring tasks are complex due to the non-linear aerodynamics of the embedded system. Referring to FIG. 3, four key terms clarify a UAV's operation: (1) roll, which is the UAV's longitudinal rotation, moving left or right; (2) pitch, which is the lateral rotation tilting the UAV forward or backward; (3) yaw, which is the rotation about the vertical axis, pivoting the UAV clockwise or counterclockwise; and (4) throttle, which controls the UAV's vertical motion, dictating its speed. UAVs, controlled remotely or autonomously, use inertial measurement units (IMUs) for sensor data refined by noise and Kalman filters. After analog-to-digital converter (ADC) sampling, this data informs PID controllers to determine roll, pitch, and yaw error signals. These signals then guide PWM outputs for the motors, as shown in FIG. 2. Then, firmware acts as the intermediary software layer, guiding the UAV's operations by translating high-level commands into actionable hardware responses. By understanding the PWM output generated by this control process (being "control-fused"), an IDS can effectively identify a broad spectrum of attacks anywhere in the sensor-control-actuation process.

The dynamics of UAV movement are fundamentally governed by the motors' response to PWM signals, which control their speed and, consequently, the thrust generated by each rotor. The angular velocity of motor i, denoted as $\omega_i$, is a function of the PWM signal provided to it, as shown in the following Equation 1:

$$\omega_i = f(PWM_i) \quad (1)$$

where $\omega_i$ is the angular velocity of motor i, and $PWM_i$ is the PWM signal to motor i. The function $f$ maps PWM signals to motor speed. The thrust generated by each motor, $F_i$, is proportional to the square of its angular velocity, which is represented by the Equation 2:

$$F_i = k \cdot \omega_i^2 \quad (2)$$

where $F_i$ is the thrust produced by motor i, and k is the thrust coefficient. Roll motion is controlled by creating a differential in the speed of motors on either side of the UAV's longitudinal axis, as shown in Equation 3.

$$\Delta\omega_{roll} = g_{roll}(PWM_2 + PWM_4 - PWM_1 - PWM_3) \quad (3)$$

where $\Delta\omega_{roll}$ is the change in roll motion, and $g_{roll}$ is a gain factor for roll. Pitch motion is similarly controlled through a differential in the speed of front and back motors, as described by Equation 4:

$$\Delta\omega_{pitch} = g_{pitch}(PWM_1 + PWM_2 - PWM_3 - PWM_4) \quad (4)$$

where $\Delta\omega_{pitch}$ is the change in pitch motion, and $g_{pitch}$ is a gain factor for pitch. Yaw motion is achieved by varying the speed of motors spinning in opposite directions, which is mathematically formulated as in Equation 5:

$$\Delta\omega_{yaw} = g_{yaw}\left(\sum_{i \in CW} \omega_i - \sum_{i \in CCW} \omega_i\right) \quad (5)$$

where $\Delta\omega_{yaw}$ represents the change in yaw motion, and $g_{yaw}$ is a gain factor for yaw. CW and CCW denote the sets of motors spinning clockwise and counterclockwise, respectively.

Finally, the overall thrust, which controls the UAV's altitude, is the sum of the thrusts from all four motors as in Equation 6 where $T_{total}$ is the total thrust for altitude control. These equations collectively illustrate how PWM signals are critical to achieving precise control over the UAV's orientation and altitude, enabling it to perform complex maneuvers and maintain stable flight. The PWM signal includes alternating high ($T_{ON}$) and low ($T_{OFF}$) pulses. The motor speed depends on the pulse duration, where a longer pulse indicates greater voltage and faster rotation. Typically, a motor expects a pulse between 1 millisecond (ms) and 2 ms in a 400 Hertz (Hz) waveform. For UAVs, especially those with Pixhawk flight controllers, the pulse duration typically ranges from 1.1 ms to 1.9 ms. When $T_{ON}$ is high 100% of the time, full bus voltage drives the motor. At 50%, half the bus voltage is applied and none during $T_{OFF}$.

In a Pixhawk UAV, the PWM value, ranging from 1100 microseconds (µs) to 1900 µs, is derived from sensor input, the desired UAV attitude, and control commands. Pixhawk employs a control pipeline wherein control groups (inputs) map to output groups (PWM outputs) via a mixer. This mixer translates force commands, like turning left, into actuator commands influencing roll, pitch, or yaw. For instance, a control group might indicate a desired vehicle attitude, scaled from −1 to +1. The mixer then maps this to a PWM output channel, such as 1500 µs.

As intricate cyber-physical systems, UAVs often undertake mission-critical tasks where precision and adherence to a specific trajectory are paramount. While tampering with the hardware supply chain demands profound knowledge, resources, and access, some alarming instances of such breaches have been reported. Notably, the 2018 compromise of Supermicro servers used by tech giants resulted from illicitly embedded chips during manufacturing, facilitating unauthorized data access. Similarly, concealed hardware Trojans have shown potential for remote deactivation of sophisticated defense systems and insidious privilege escalation attacks, as evidenced by Intel's Management Engine (ME), revealed in 2018, epitomizes another latent vulnerability, granting unmitigated control over computers and undermining user security. This requires the UAVs to be secured from end-to-end and be resilient to attacks in their network, firmware, and hardware. While existing IDSs can counter some threats, such as distributed denial of service (DDoS) attacks, they predominantly rely on sensor data. This leaves them oblivious to a UAV's flight control. For instance, a covert HT embedded within a flight controller could manipulate the PWM values, altering motor speeds and disrupting the UAV's intended trajectory. Related art IDSs fall short in detecting PWM-manipulative attacks. The PWM signals can be manipulated in the following ways to disorient UAVs:

Jamming: adversarial interference within the PWM communication frequency causing UAV control loss.

Replay attacks: replaying previously captured legitimate PWM signals to disorient UAVs.

Malware or firmware attacks: altering PWM signals via firmware infiltration.

EMI: stealthy modification of PWM signals via induction.

Physical tampering: a direct threat to PWM integrity through HT insertion.

A PWM-exploitative attack can have ranging impacts. The attack's efficacy can be demonstrated by directly manipulating PWM values, introducing a sizeable increment, and drastically altering the expected motor outputs. This calculated injection of erroneous control signals can lead to pronounced alterations in roll, pitch, or yaw movements, compelling the UAV to subtly deviate from its prescribed trajectory at first, then more noticeably over time. Unless finely tuned to detect such anomalies, the UAV's control system may not immediately recognize the malicious intent, attributing the deviations to environmental factors or sensor errors, thus allowing the adversary to achieve its objective of redirecting the UAV without raising immediate alarms. It is important to note that related art IDSs typically operate before the generation of PWM signals. Therefore, if an attack targets these positional errors, any corrective actions taken by these IDSs can be effectively negated. This happens because the manipulated PWM signals generated after the IDS intervention continue to direct the UAV erroneously, undermining the corrective measures of the IDS and leading to severe consequences. Hence, an IDS integrating advanced intrusion detection mechanisms specifically targeting PWM signal manipulation is essential to address this.

Following is an example of a threat model for UAVs.

Threat Model Assumptions

The PWM attacks faced by UAVs manifest as stealthily installed HT that manipulates the PWM output values after the flight controller generates them.

The HT insertion is an insider attack, meaning the attacker in the untrusted supply chain has physical access to the target components of UAVs.

The attacker has the knowledge of the PWM control of motors in a UAV and can exploit vulnerabilities accordingly.

The manipulated PWM values cannot be out of band (1100 µs-1900 µs).

ConFIDe is integrated into the UAV ecosystem at the user (trusted) side after the conventional supply chain. Hence, it is free from supply chain attacks. To ensure this, ConFIDe can be installed in a trusted computing base (TCB).

Knowledge of the Adversary (Threat Model)

It can be assumed that the adversary is knowledgeable of the relationship between the PWM signals generated by the flight controller and the servo motor functions in a UAV. Whether guided remotely or autonomously, a UAV's flight is executed by its PWM signals, providing the adversary a great motivation to exploit.

Attack Goal (Threat Model)

The primary attack goal considered is the stealthy alteration of the PWM signals to lead the UAV to stray from its intended behavior. To alter the signal, the attacker can use, for example, jamming, replay attacks, malware or firmware attacks, EMI, and/or physical tampering. As a test case, an HT can be implemented to alter the PWM selectively. The impacts of other HT-based PWM alterations can also be simulated via software modifications due to equipment restrictions.

Attack Technique (Threat Model)

An HT is an intentional modification within an integrated circuit (IC) that includes a trigger and an associated action known as a payload. The trigger is activated when specific conditions are met, leading the payload to execute its malicious operation. These modifications can bypass security mechanisms, impairing or completely disabling parts of the IC. Despite advancements in semiconductor technology, ICs remain susceptible to HTs placed by adversaries. By subtly altering the PWM signal timings, even a minuscule Trojan can have significant repercussions. A PWM-focused HT attack can be demonstrated in at least the following two ways: first, through synthetic generation; and second, via practical implementation on an actual UAV. It can be assumed that the Trojan is active 25% of the time. As a payload, a selective signal inversion can be introduced, altering the PWM signal's duty cycle and affecting motor speed and, subsequently, UAV movement.

$$S_{orig}(t) = \begin{cases} 1 & 0 \le (t \bmod T_{total}) < D \cdot T_{total} \\ 0 & D \cdot T_{total} \le (t \bmod T_{total}) < T_{total} \end{cases} \quad (7)$$

The original PWM signal, $S_{orig}(t)$, defined in Equation 7, can be defined by its duty cycle D, which represents the fraction of $T_{total}$ during which the signal is active. Specifically, for time t, the signal is "on" between 0 and $D \times T_{total}$. The Trojan-infected PWM signal has a duty cycle, $D_{att}$, altered by $\Delta D$ from the original one (Equation 8). The infected PWM signal is expressed by Equation 9.

$$D_{att} = D + \Delta D \quad (8)$$

$$S_{alt}(t) = \begin{cases} 1 & 0 \le (t \bmod T_{total}) < D_{alt} \cdot T_{total} \\ 0 & D_{att} \cdot T_{total} \le (t \bmod T_{total}) < T_{total} \end{cases} \quad (9)$$

Other HT-based PWM attacks can be simulated by software/firmware modifications. For example, an attack to invert a motor's PWM outputs can employ a trigger-payload logic, where motor outputs are inverted only when a specific condition is met. Algorithm 2 in FIG. 28 provides a concise outline. It inputs current motor outputs and their count, then iterates through each motor output and examines for reversibility. If the trigger condition is satisfied, it adjusts the value accordingly, storing the result in the inverted_outputs array.

Attack Data Generation (Threat Model)

Internal attacks on UAVs, like HTs, can also be simulated by creating synthetic PWM anomalies within the operational range of 1100 µs to 1900 µs for Pixhawk-based UAVs. This approach maintains the data's integrity and tests the ability of the IDS to detect subtle control disruptions within the normal PWM signal range. Given that $T_{ON}$ and $T_{OFF}$ are respective on and off times of the PWM waveform, the total period of the waveform $T_{total}$ can be computed as shown in Equation 10.

$$T_{total} = T_{ON} + T_{OFF} \quad (10)$$

The given equation can be used to produce synthetic attack samples based on HT logic. Given the PWM waveform period for a Pixhawk flight controller is 2500 µs, a benign PWM value, denoted as $PWM_{Benign}$, can be inverted to yield $PWM_{Inverted}$, as illustrated in Equation 11.

$$PWM_{Inverted} = abs(2500 \text{ µs} - PWM_{Benign}) \quad (11)$$

A Pixhawk flight controller limits the band of its computed PWM values as shown in Equation 12, ensuring that the synthetic attack samples are within the specified bounds of PWM.

$$\text{effective\_PWM} = \quad (12)$$
$$\text{control\_value} \times \frac{\text{max\_PWM} - \text{min\_PWM}}{2} + \frac{\text{max\_PWM} + \text{min\_PWN}}{2}$$

Figure 4A:
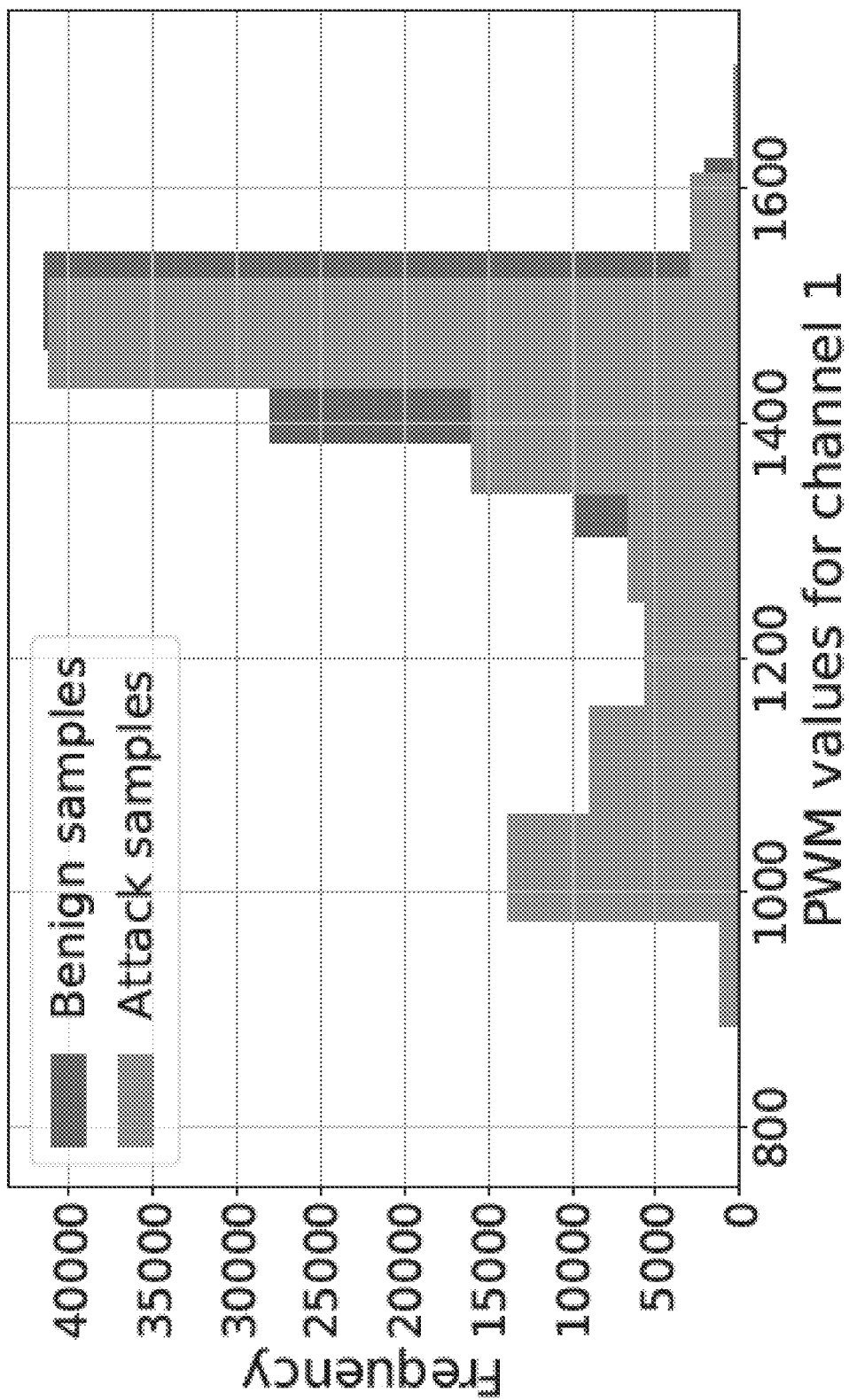
FIG. 4A shows a bar chart of frequency versus PWM values, showing benign and malicious samples for a PWM-manipulative hardware Trojan attack in channel 4.
Figure 4B:
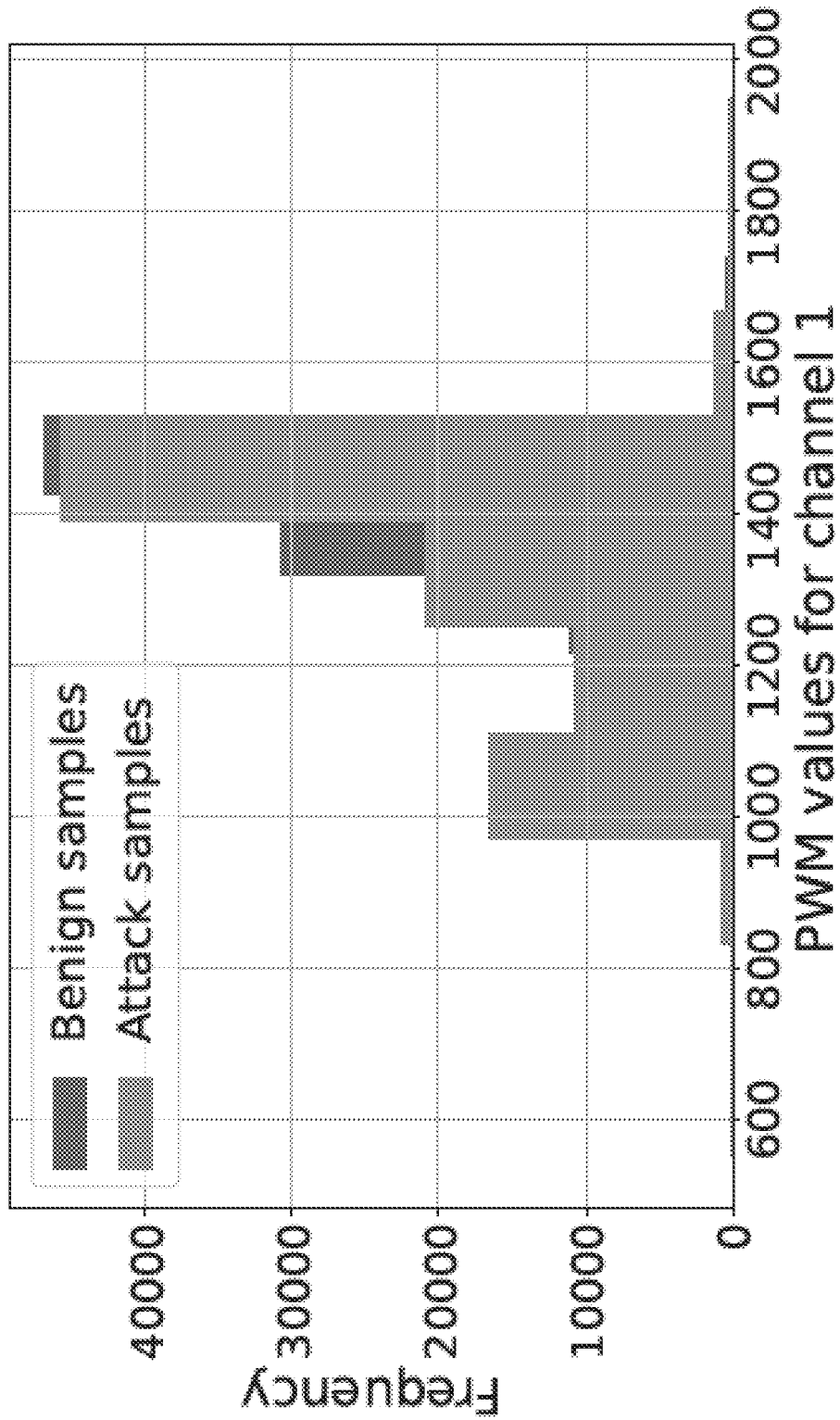
FIG. 4B shows a bar chart of frequency versus PWM values, showing benign and malicious samples for a PWM-manipulative hardware Trojan attack in channel 1.

The mixer sets control values, ensuring that PWM signals adhere to the UAV's operational range. Any value outside this range, such as below 1100 µs, is auto-corrected to the minimum limit. The process is outlined in Algorithm 1 shown in FIG. 27. Attack samples for channels 4 and 1 are illustrated in FIGS. 4A and 4B, respectively, showing subtly aligned benign and altered PWM values.

ConFIDe can have a flight-control and PWM mapping phase, a training phase, and/or a classification phase. With respect to the flight-control and PWM mapping phase, selecting accurate features for flight controller modeling is crucial for simulating a UAV's flight control process. Precision in PWM value prediction can be achieved by minimizing the root mean squared error (RMSE). Given the non-linear relationships inherent in UAV features, a neural network-based Keras regressor can be used (see also, Badaracco, Advanced usage of scikeras wrappers, adriangb- .com/scikeras/stable/advanced.html; which is hereby incorporated by reference herein in its entirety). The link between control features and PWM values stems from their use as inputs to the flight controller's firmware, generating motor-driving PWM signals. ConFIDe's regressor can model this relationship using training data. Deviations from expected PWM outputs can thus be identified as anomalies. This mapping, which helps integrate the entire sensor-control-actuation cycle, is at the heart of ConFIDe's real-time intrusion detection mechanism. This mapping was developed using a diverse dataset collected from real-world missions, covering a wide spectrum of UAV behaviors and environmental conditions. This dataset was specifically designed to encapsulate the variability in control feature-to-PWM value mappings that might arise due to differences in varied flight parameters.

Figure 7A:
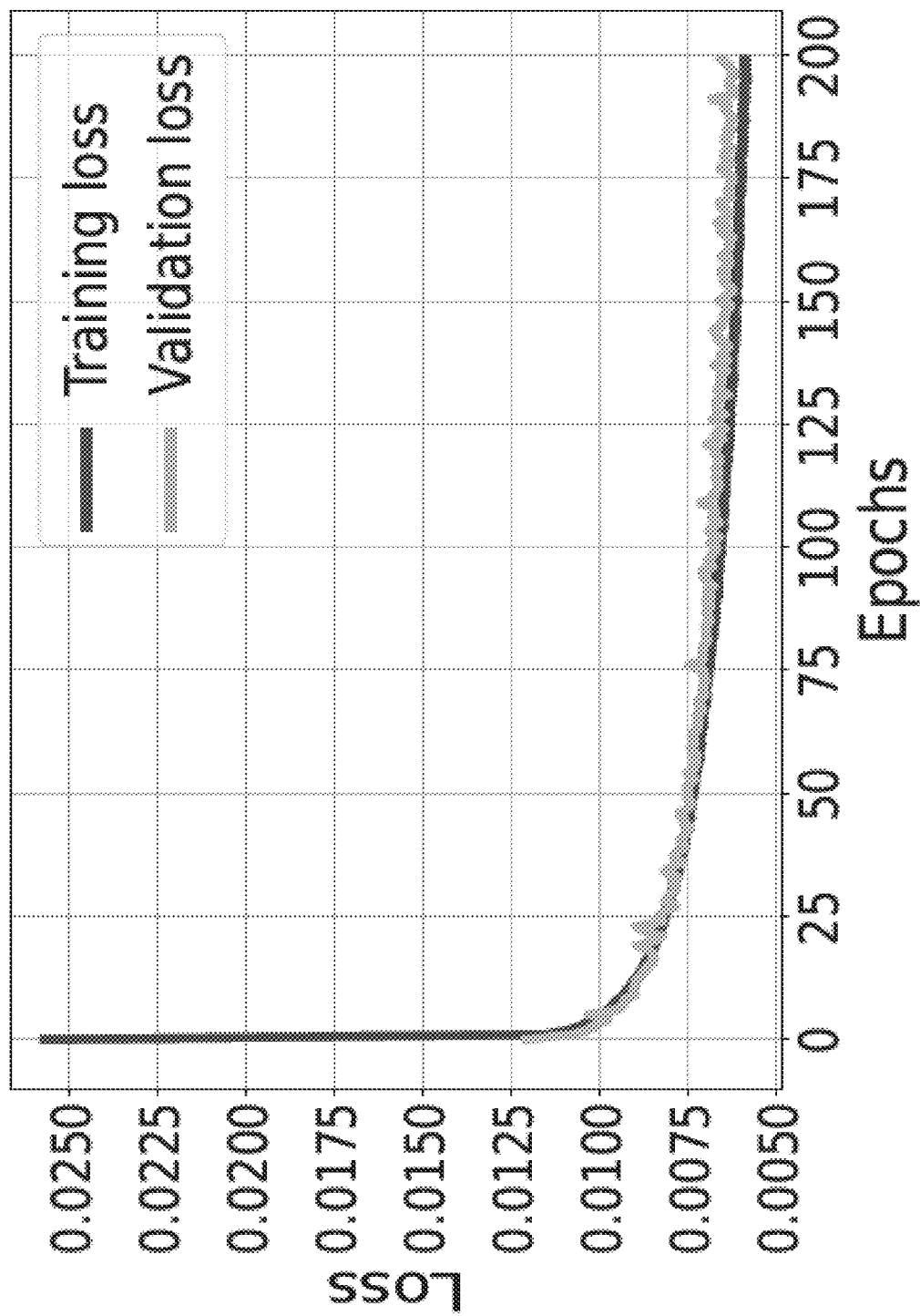
FIG. 7A shows a plot of loss versus epochs, showing that a regression model's training and validation losses demonstrate effective PWM prediction
Figure 7B:
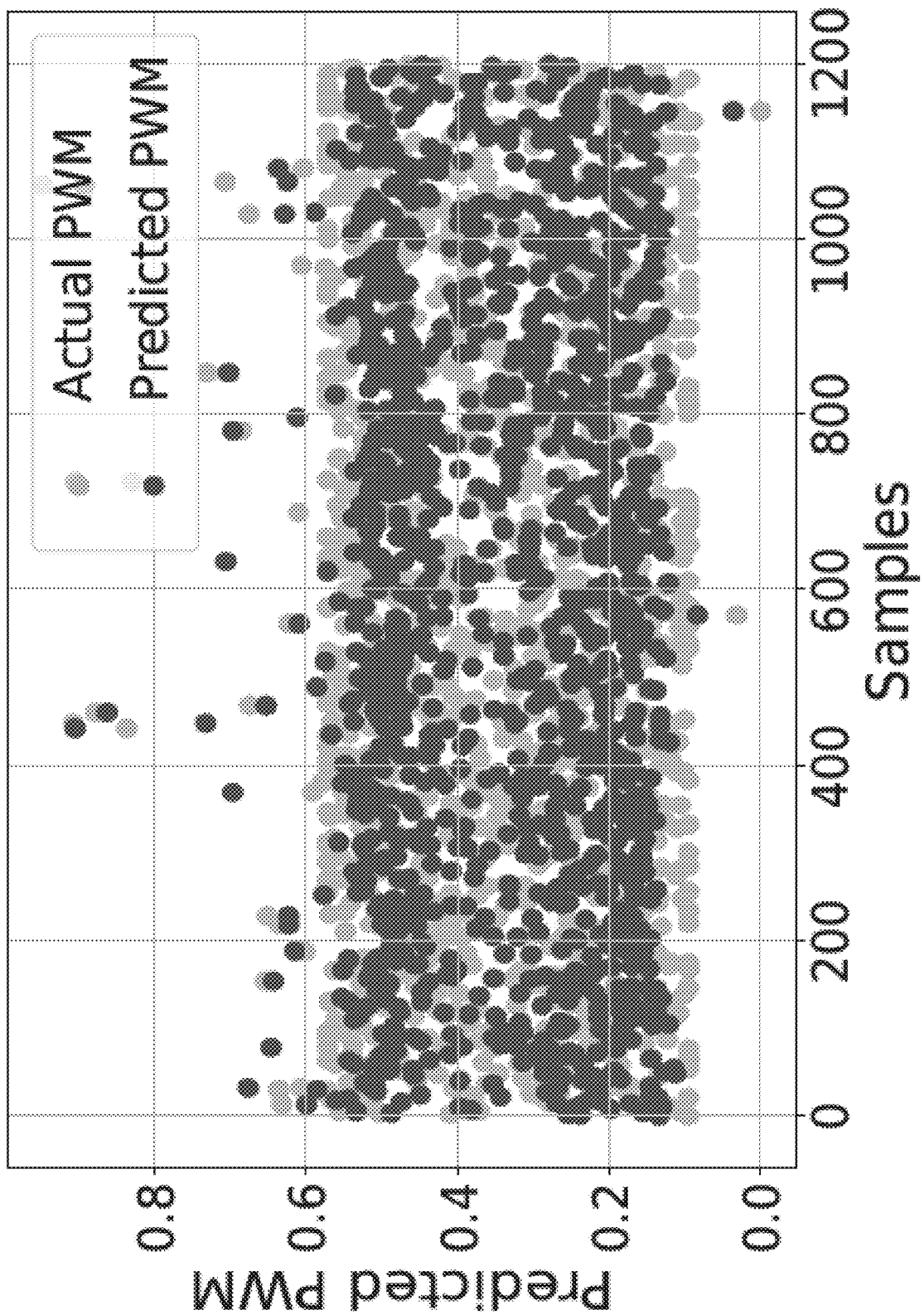
FIG. 7B shows a plot of predicted PWM versus samples, showing a strong correlation that underscores the effectiveness of the chosen features in anomaly detection.

With respect to the regressor architecture, the model can include a plurality of flight control inputs (e.g., 33 flight control inputs) and a plurality of hidden layers (e.g., five hidden layers), and the model can predict a plurality of PWM outputs (e.g., four PWM outputs). The model can be trained over a large number of epochs (e.g., 200 epochs or at least 200 epochs) with a batch size of, for example, 270. The model can yield, for example, a mean absolute error of 0.058 or less, a MSE of 0.0066 or less, and an RMSE of 0.0814 or less. The training loss and PWM predictions are illustrated in FIG. 7A and FIG. 7B, respectively.

With respect to the training phase, ConFIDe can use one-class classification algorithms to create a decision boundary from existing data. Significant deviations can be flagged as anomalies in testing and real-time operations. A neural network-based AE can be employed, as alternatives like one-class support vector machine (OCSVM) and density-based spatial clustering of applications with noise (DBSCAN) are computationally intensive and less adept at understanding the nuanced non-linear relationships in UAV flight data. The AE can provide a more robust framework for understanding the intricate dynamics of UAV flight control data. This is primarily due to its ability to learn a dense, low-dimensional representation of the data, which inherently captures the complex relationships within the UAV's operational signals. The AE reconstructs original network traffic at its output layer by learning intrinsic network traffic attributes.

With respect to network architecture, the AE can comprise sequentially connected encoder and decoder networks. The encoder, using function $f$ with parameters W and b, can map input X to a feature representation (Equation 13). The decoder, with g and parameters W' and b', can reconstruct the input from this (Equation 14).

$$H = f(WX+b) \tag{13}$$

$$Z = g(W'H+b') \tag{14}$$

With respect to hyperparameter tuning, to minimize MSE loss, the architecture can be adjusted. It can feature input and output layers with 37 nodes and five palindromic hidden layers including 52, 40, and 24 nodes, getting an MSE of $4.76 \times 10^{-4}$ after 1000 epochs.

With respect to the classification phase, the model's decision-making phase can check anomalies based on learned flight control and PWM mapping. Using the AE, classification can hinge on the reconstruction error. Test samples can be reconstructed, and their MSE against the original data can be determined. If this error exceeds the trained threshold, the sample can be marked as an outlier; otherwise, it can be considered benign.

With respect to threshold selection, to determine the anomaly detection threshold, MSEs from training samples can be analyzed, with the highest quantile setting the threshold $\mathcal{T}$. A threshold can be selected ensuring 98.99% or more of the data is benign, as shown in Equation 15. Based on this threshold, classification rules can be specified in Equation 16. Here, MSE represents the MSE per training sample, and q indicates the benign data fraction (0.9899 in this scenario). Classification rules are further detailed in Equation 16.

$$\mathcal{T} = \text{quantile}(MSE, q) \tag{15}$$

$$\text{Label} = \begin{cases} \text{"Anomaly", if } MSE_{sample} > \mathcal{T} \\ \text{"Benign", if } MSE_{sample} \leq \mathcal{T} \end{cases} \tag{16}$$

Figure 8:
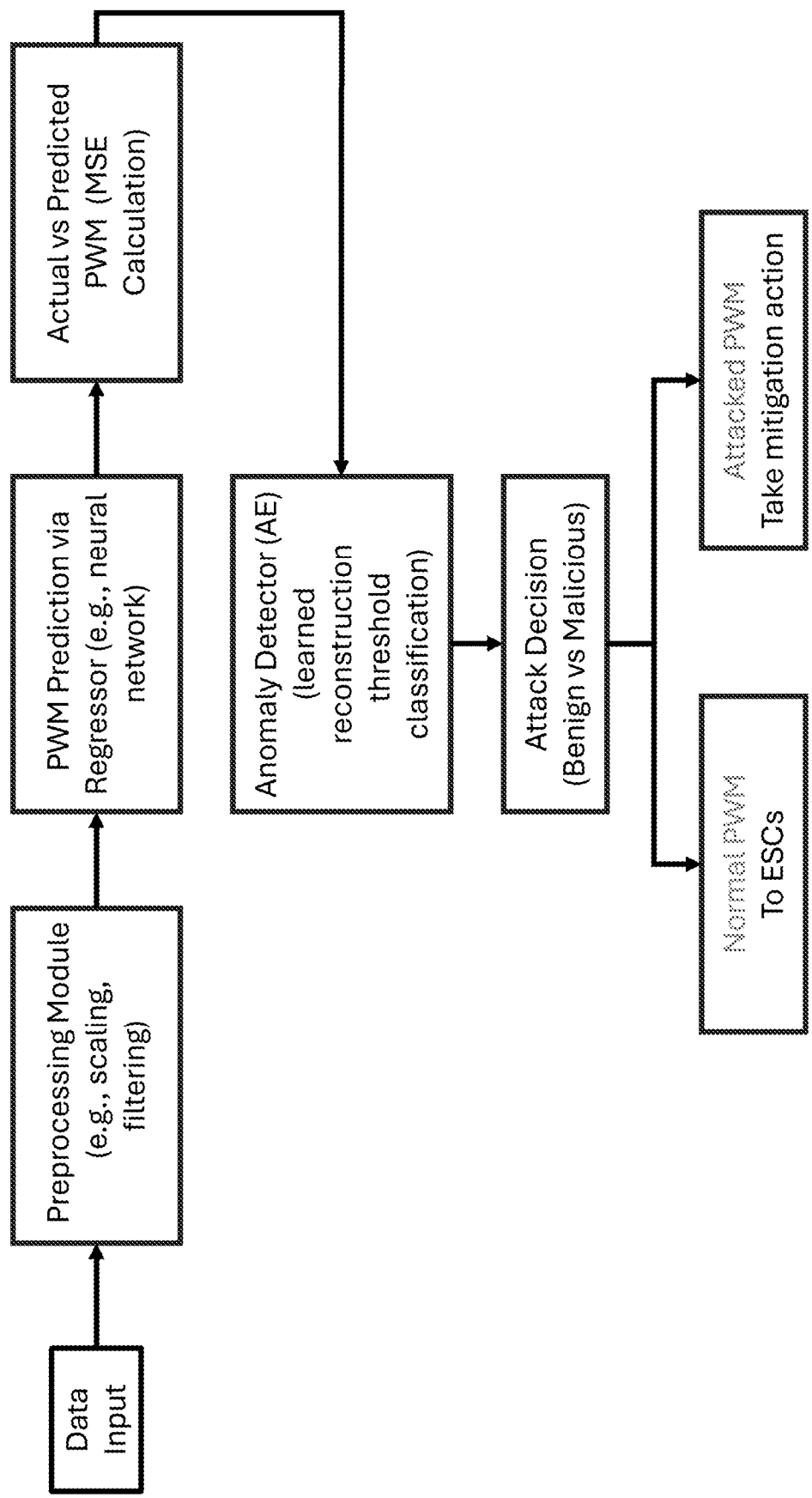
FIG. 8 shows an overview of a system/method according to an embodiment of the subject invention. Box "a" (left) shows dataset formation, with data collection and preparation. Box "b" (second from the left) shows PWM mapping, with regression for control optimization. Box "c" (second from the right) shows training, including utilizing an auto-encoder (AE). Box "d" (right) shows classification, including setting thresholds and categorizing data.
Figure 9:
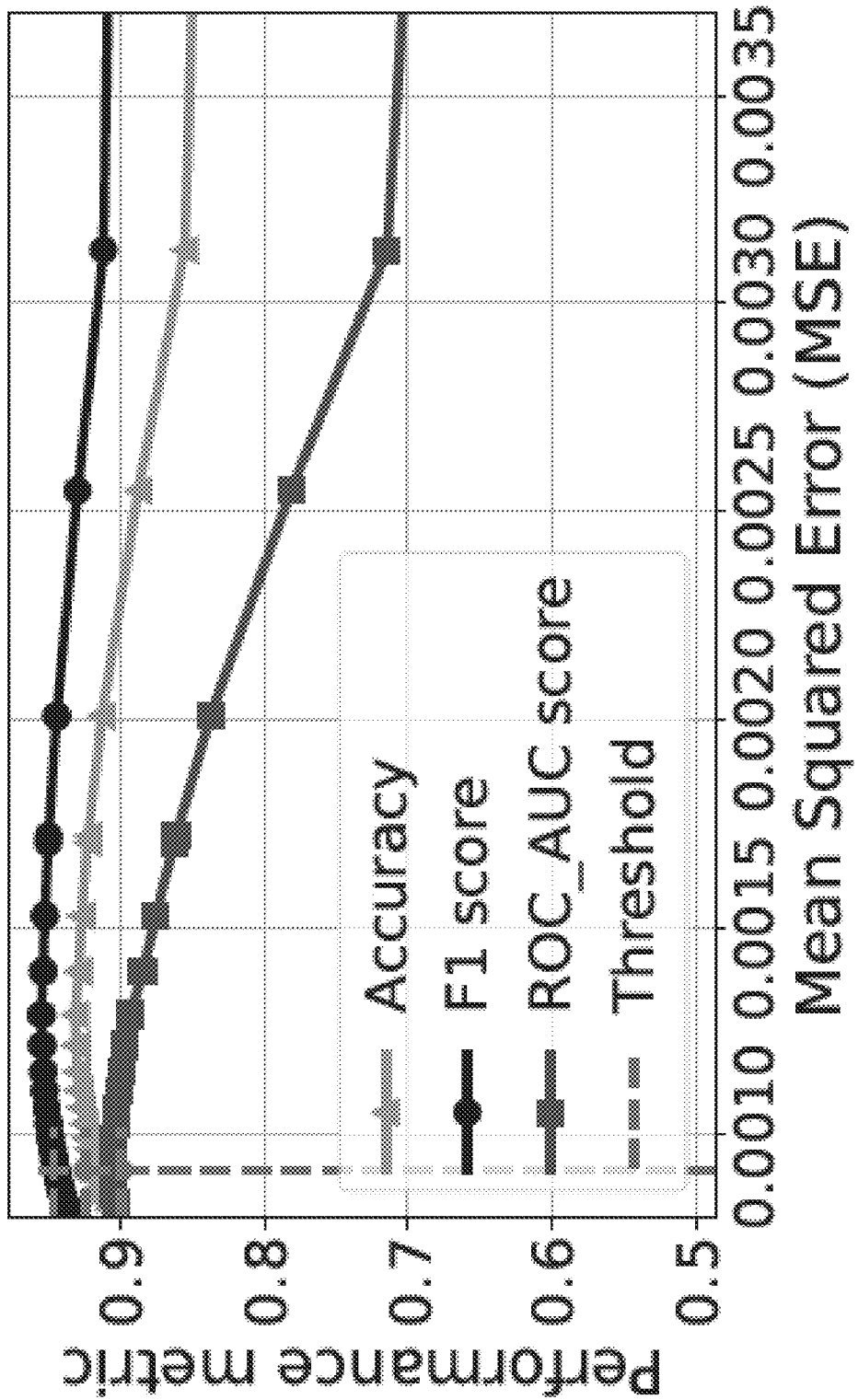
FIG. 9 shows a plot of performance metric versus mean squared error (MSE), showing AE-based classification thresholding using a quantile method. Balancing ROC-AUC score with accuracy/F1, the higher ROC signifies superior performance.

The selected threshold, 0.000917, balances ROC-AUC (0.9049) with accuracy and F1 scores, where ROC-AUC is receiver operating characteristic (ROC)-area under the curve (AUC). This threshold, as shown in FIG. 9, guides ConFIDe's performance in real-time UAV monitoring, detecting hardware/PWM threats by analyzing control data and PWM values. The ConFIDe system, illustrated in FIG. 8, operates in real-time on hardware, processing control data from the flight controller and PWM values directing the electronic speed controllers (ESCs).

Implementing ConFIDe in UAVs requires real-time data management and classification. Unlike related IDSs in a UAV's sensor/network layer, ConFIDe can integrate the knowledge of PWM signals in its system. Hence, it operates after the flight controller has generated the PWM signals. ConFIDe monitors the PWM outputs from the flight controller, verifying their legitimacy based on the flight control. Only non-anomalous PWM outputs then reach the ESCs for motor operation. ConFIDe's hardware framework includes (1) the target UAV, (2) a data collection unit, and (3) a computational device for its training and/or classification. ConFIDe can use multiple datasets for detection, such as flight control data (e.g., encompassing modules such as control, estimator status, and/or position attributes) and/or post-routine execution PWM outputs.

UAV movement control via PWM will now be discussed in more detail. Referring to FIG. 3, motors 1 and 3 rotate counterclockwise (CCW), while motors 2 and 4 rotate clockwise (CW). To control the UAV's motion, PWM signals can be varied as follows:

Forward movement (pitch control): increase the PWM signal to motors 3 and 4 and decrease to motors 1 and 2.

$$\Delta PWM_{forward} = PWM_{3,4} - PWM_{1,2} \tag{17}$$

Backward movement (pitch control): increase the PWM signal to motors 1 and 2 and decrease to motors 3 and 4.

$$\Delta PWM_{backward} = PWM_{1,2} - PWM_{3,4} \tag{18}$$

Rightward movement (roll control): increase the PWM signal to motors 1 and 3 and decrease to motors 2 and 4.

$$\Delta PWM_{right} = PWM_{1,3} - PWM_{2,4} \tag{19}$$

Leftward movement (roll control): increase the PWM signal to motors 2 and 4 and decrease to motors 1 and 3.

$$\Delta PWM_{left} = PWM_{2,4} - PWM_{1,3} \tag{20}$$

Increase altitude (thrust control): increase the PWM signal equally to all motors.

$$\Delta PWM_{up} = \uparrow PWM_{1,2,3,4} \quad (21)$$

Decrease altitude (thrust control): decrease the PWM signal equally to all motors.

$$\Delta PWM_{down} = \downarrow PWM_{1,2,3,4} \quad (22)$$

Yaw control (rotation control): for right (CW) rotation, increase PWM to motors 1 and 4 and decrease to motors 2 and 3.

$$\Delta PWM_{yaw\text{-}right} = (\uparrow PWM_{1,4}) - (\downarrow PWM_{2,3}) \quad (23)$$

For left (CCW) rotation, increase PWM to motors 2 and 3 and decrease to motors 1 and 4.

$$\Delta PWM_{yaw\text{-}left} = (\uparrow PWM_{2,3}) - (\downarrow PWM_{1,4}) \quad (24)$$

In these equations, $\Delta PWM_{movement}$ represents the change in the PWM signal required for a specific movement. The symbol $\uparrow$ indicates an increase and $\downarrow$ indicates a decrease in the PWM signal's duty cycle. The magnitude of PWM adjustments depends on the desired movement intensity, quadcopter characteristics, and motor response.

The PWM output constraint calculation function will not be discussed in more detail. This function can scale the input value according to the motor's configuration. FIG. 17 shows a code snippet in the mixer_module code that limits the PWM outputs to ensure they are not out of the specified band. This function, which can be referred to as output_limit_calc_single, can take two inputs: the index i for the motor channel; and the normalized control input value. It can calculate the effective output for the motor channel by scaling the input value based on the motor's minimum and maximum values, which are stored in the arrays_min_value and _max_value, respectively. First, the function can check for invalid or disabled channels by verifying if the input value is finite. If the input value is not finite, the function returns the disarmed value for the motor channel, which is stored in the array _disarmed_value. Next, the function can check if the motor output should be reversed by examining the _reverse_output_mask. If the corresponding bit for the motor channel is set, the input value is multiplied by −1 to reverse its direction. The function can then calculate the effective output by scaling the input value according to the motor's minimum and maximum values. This scaling can ensure that the output value is within the valid range for the motor. Finally, the function can use the math::constrain function as a last line of defense to ensure that the calculated effective output is within the motor's valid range. The function can return the constrained effective output value so the PWM values are within range.

Figure 19A:
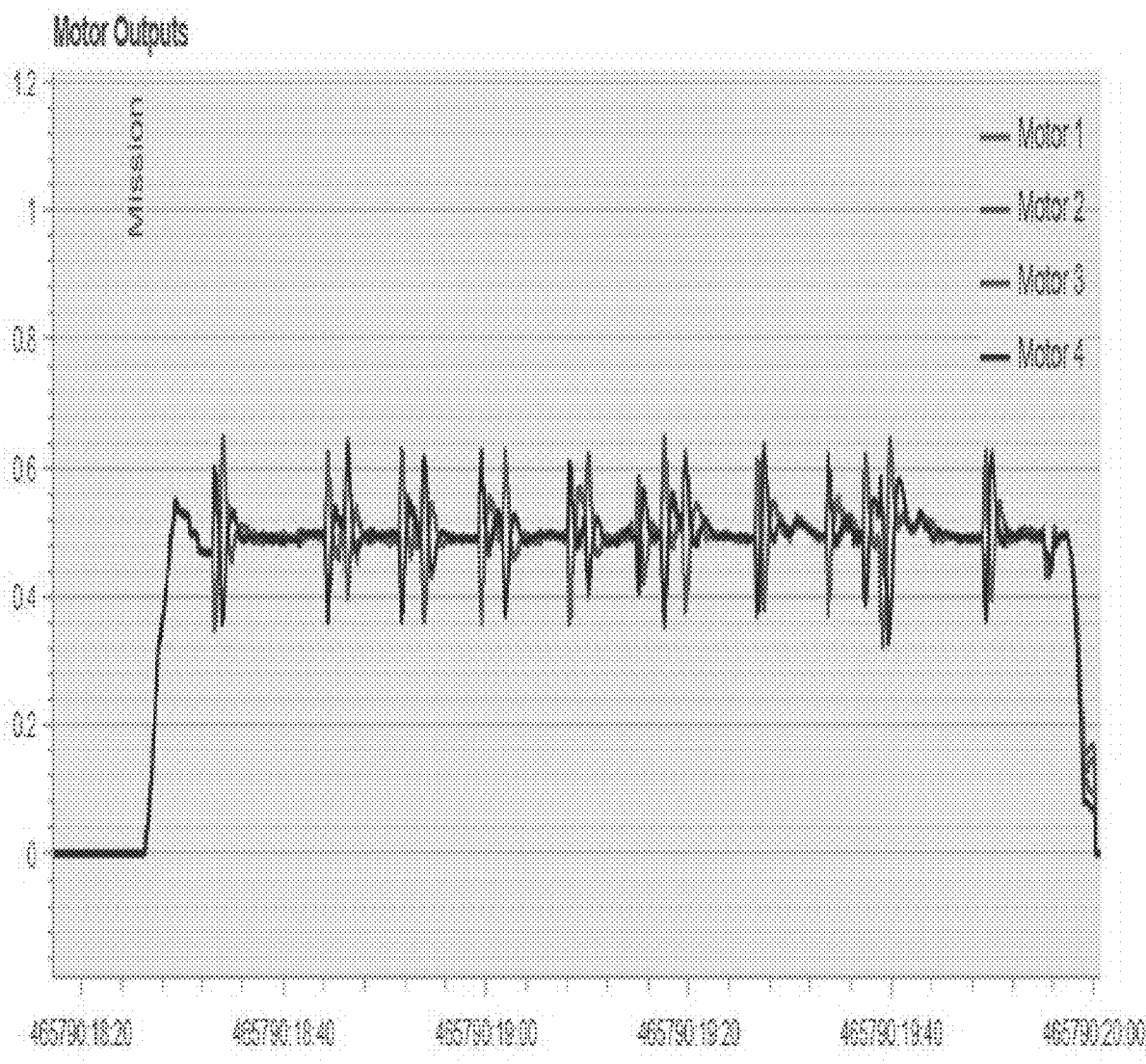
FIG. 19A shows the PWM outputs achieved under a normal trajectory.
Figure 19B:
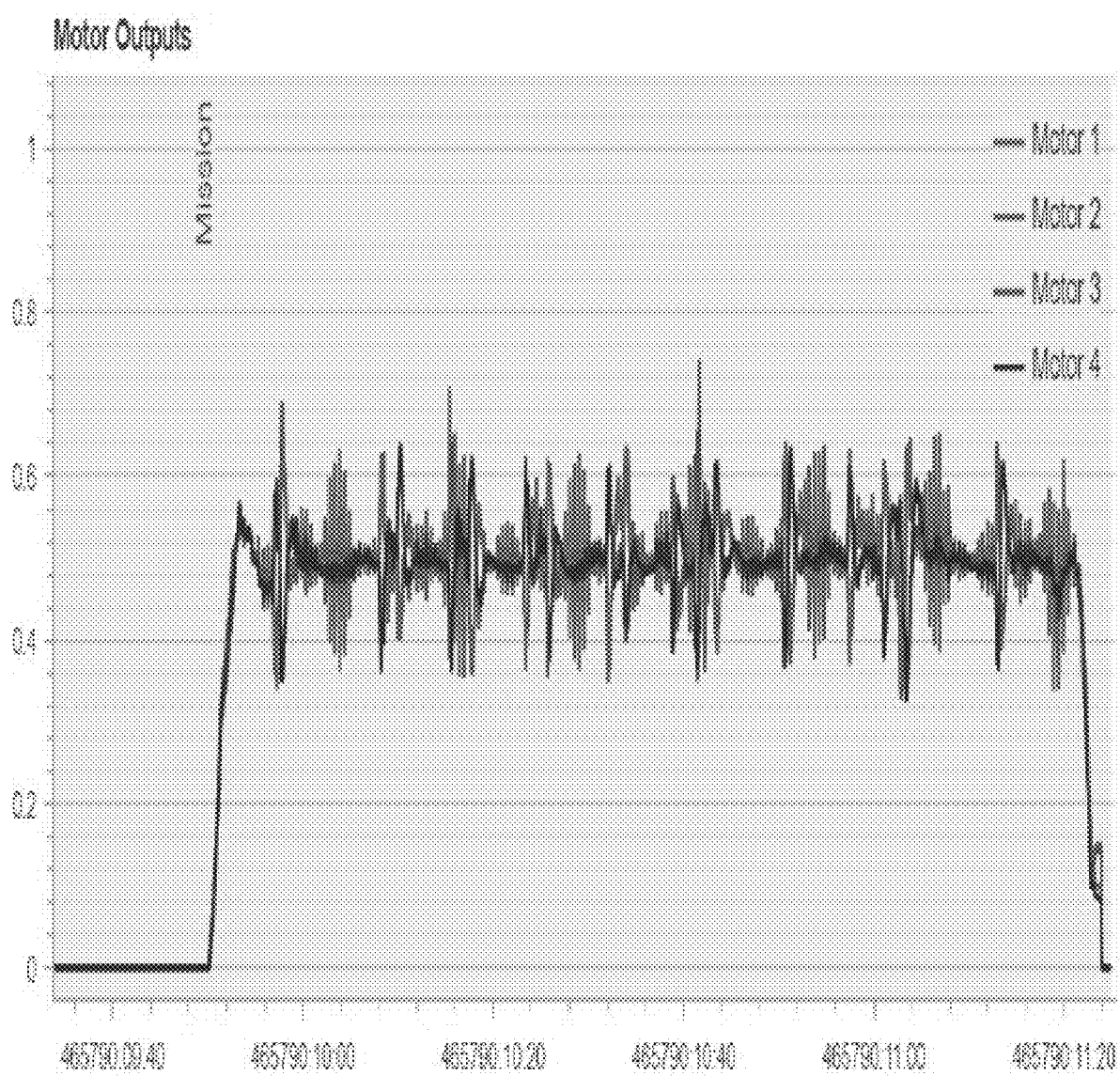
FIG. 19B shows the PWM outputs achieved under a PWM-manipulative attack.

Dataset formation will not be discussed in more detail. Existing UAV datasets primarily feature camera images, lacking control data vital for IDS training. Hence, a dataset was developed with essential flight control attributes. With respect to flight data collection, various flights from a Pixhawk 2.4.8 UAV were experimented with, closely emulating real-world missions, which included circular paths, polygonal paths, paths with multiple waypoints with increasing or decreasing speed and altitude, and survey missions in which the UAV flew through various obstacles. Throughout these complex flights, the flight controller logged the sensor, control, actuation, and other data, which can facilitate understanding the mapping of the flight control with PWM signals. After the flights, the flight logs were downloaded, and preprocessing could begin. The trajectories are shown in FIGS. 18A-18D, and PWM outputs are shown in FIGS. 19A and 19B.

With respect to data preprocessing, this is pivotal for IDS efficacy because imbalanced datasets can skew classifications. Files (e.g., .ulg files) were extracted from the logs of seven trajectories via QGroundControl and converted to another format (e.g., .csv format), yielding 495 files (or around 70 for each trajectory). These files, documenting varying features at distinct flight controller instances, present asynchronous data recordings. For example, a sensor data logged at time $t_1$ might have its corresponding controller action recorded at $t_{1+x}$, where x represents the delay in timeslots. To provide a coherent view, individual files were combined per trajectory into a single file, encompassing timestamps and features.

To address missing data, interpolation techniques between $t_1$ and $t_{1+x}$ were employed, amalgamating data from all seven flights into a unified dataset. Upon further interpolation, duplicate removal, and discarding zero-value columns, the dataset encompassed 225,921 samples spanning 636 feature columns. Feature selection was performed and 33 pivotal features were selected. These essential features capture the heart of the UAV's control process—control inputs, positional accuracy, GPS data, altitude, orientation metrics, and core motion angles. The methodology considered the real-time nature of the system by selecting features that can be acquired in real-time from the UAV (e.g., via MAVlink). This is useful for developing a real-time IDS to detect attacks and anomalies during the UAV's flight, allowing immediate corrective actions. In contrast, data obtained from flight logs are only available after the mission is complete and may not be suitable for real-time IDS. Therefore, selecting features that can be obtained in real-time is important for developing an effective real-time IDS.

The features selected for Confide encompass a comprehensive set of parameters critical for assessing the drone's flight dynamics, orientation, and control. Features such as control signals provide insights into the immediate commands dispatched to the drone, ensuring that real-time decisions are made based on authentic and un-altered signals. Positional metrics, including latitude, longitude, altitude, and linear positions (x, y, z), are important to accurately track the drone's location and movement in three-dimensional (3D) space. Quaternion orientation and body metrics give a nuanced perspective on the drone's orientation in 3D space, which is important for maintaining stability during flight. Additionally, test ratios, such as mag_test_ratio, ensure the authenticity of various data streams, guarding against potential anomalies or intrusions. Last, PWM signals and output signals reveal the drone's motor control dynamics, an important component for flight control and maneuvering. These features were selected to ensure a robust and holistic view of the drone's operation, making ConFIDe an effective tool for detecting and mitigating possible anomalies. The features are listed in the table in FIG. 26. ConFIDe's detailed feature selection, including quaternion components, yaw speed, and thrust_body, enhances its monitoring capabilities, vital for drone security in the rapidly evolving cyber threat landscape. These features critically track spatial orientation, aiding in detecting unauthorized intrusions or malfunctions. Additionally, error metrics like eph and epv bolster ConFIDe's precision, flagging even minor positional deviations. Such meticulous attention to detail is important for UAVs, as small errors can lead to significant navigational issues over time. ConFIDe can thus play a pivotal role in protecting operational integrity, ensuring airspace safety, and safeguarding ground assets. Also, incorporating MAVlink communication metrics, ConFIDe can effectively interpret signal integrity and timing, critical for verifying command execution fidelity. Signal-to-noise ratio (SNR) measurements of GPS signals can also be utilized, enhancing the detection of spoofing attempts by analyzing deviations from expected transmission profiles. These specific metrics can further enhance ConFIDe's diagnostic capabilities, ensuring comprehensive surveillance over the UAV's communication and control systems.

Embodiments of the subject invention provide a focused technical solution to the focused technical problem of how to detect (and prevent or inhibit) attacks and anomalies during a UAV's flight. The solution is provided by comparing the PWM data of the UAV during flight to an error threshold determined using one or more models (e.g., machine learning and/or artificial intelligence models) based on data (e.g., flight data) about the UAV and/or its expected flight. This technical solution is specific to UAV technology, addresses a technical problem within the field of UAV technology, and results in improved UAVs by inhibiting or preventing attacks on the UAV during flight. Embodiments of the subject invention have the focused, technologically-specific practical application of inhibiting or preventing attacks on the UAV during flight, resulting in improved UAV operation and minimization or elimination of severe consequences that could otherwise occur if an in-flight attack on the UAV is successful.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Hardware Trojan attacks were implemented, both practically in a UAV and through software modification in jMAVsim simulator.

Figure 20:
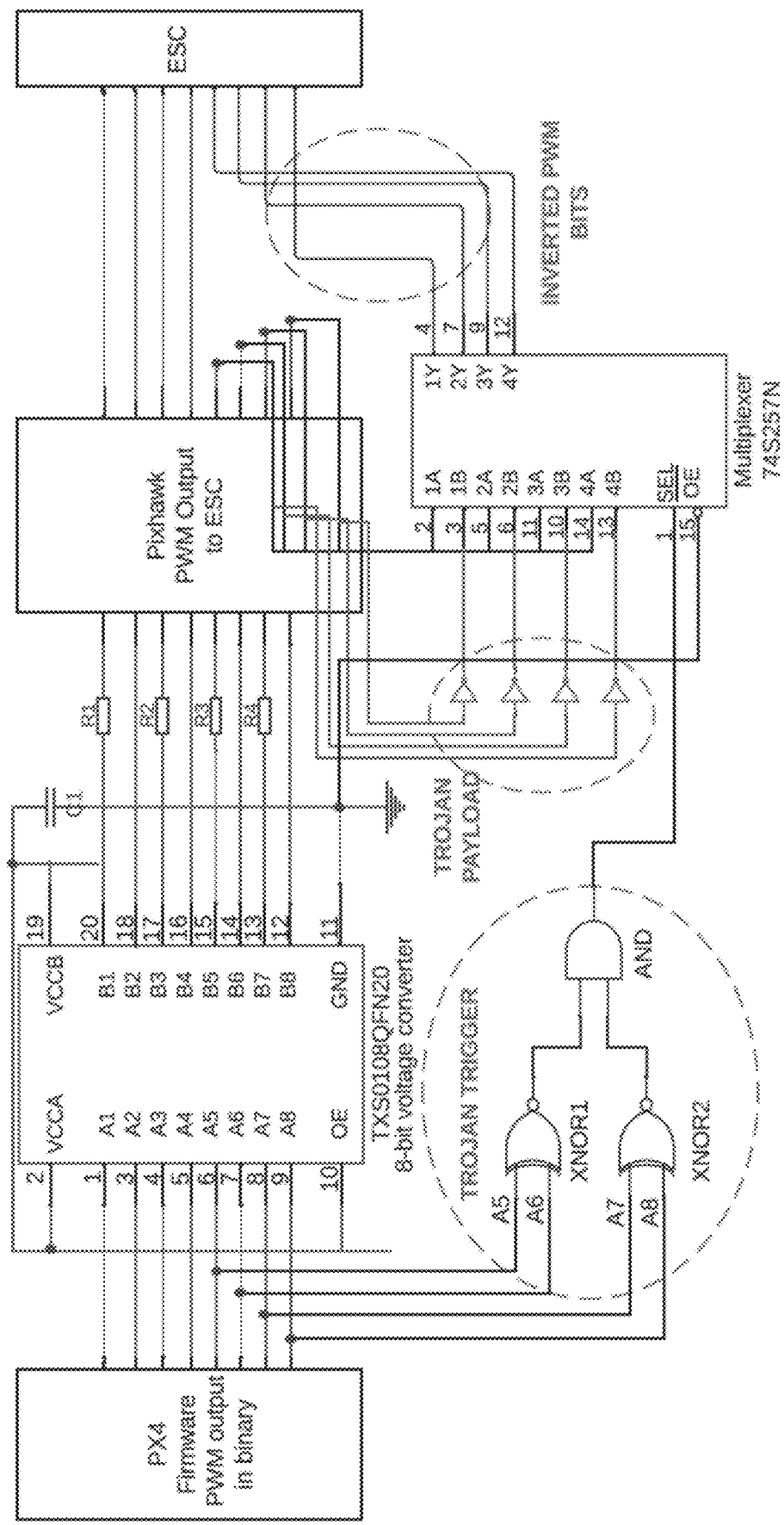
FIG. 20 shows a schematic view of an implemented hardware Trojan circuit.
Figure 21A:
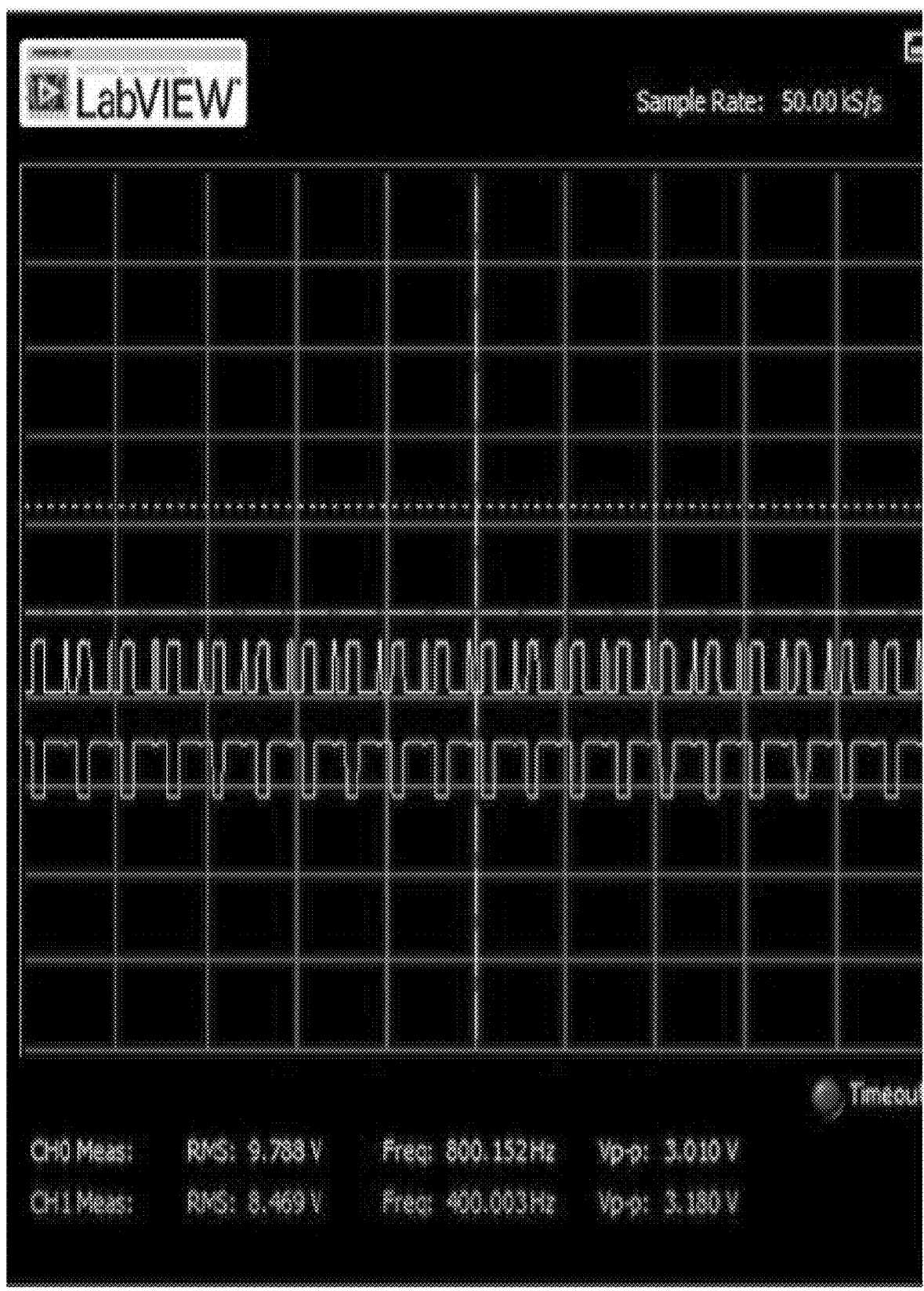
FIGS. 21A and 21B show a duty cycle alteration in PWM due to a hardware Trojan attack.
Figure 21B:
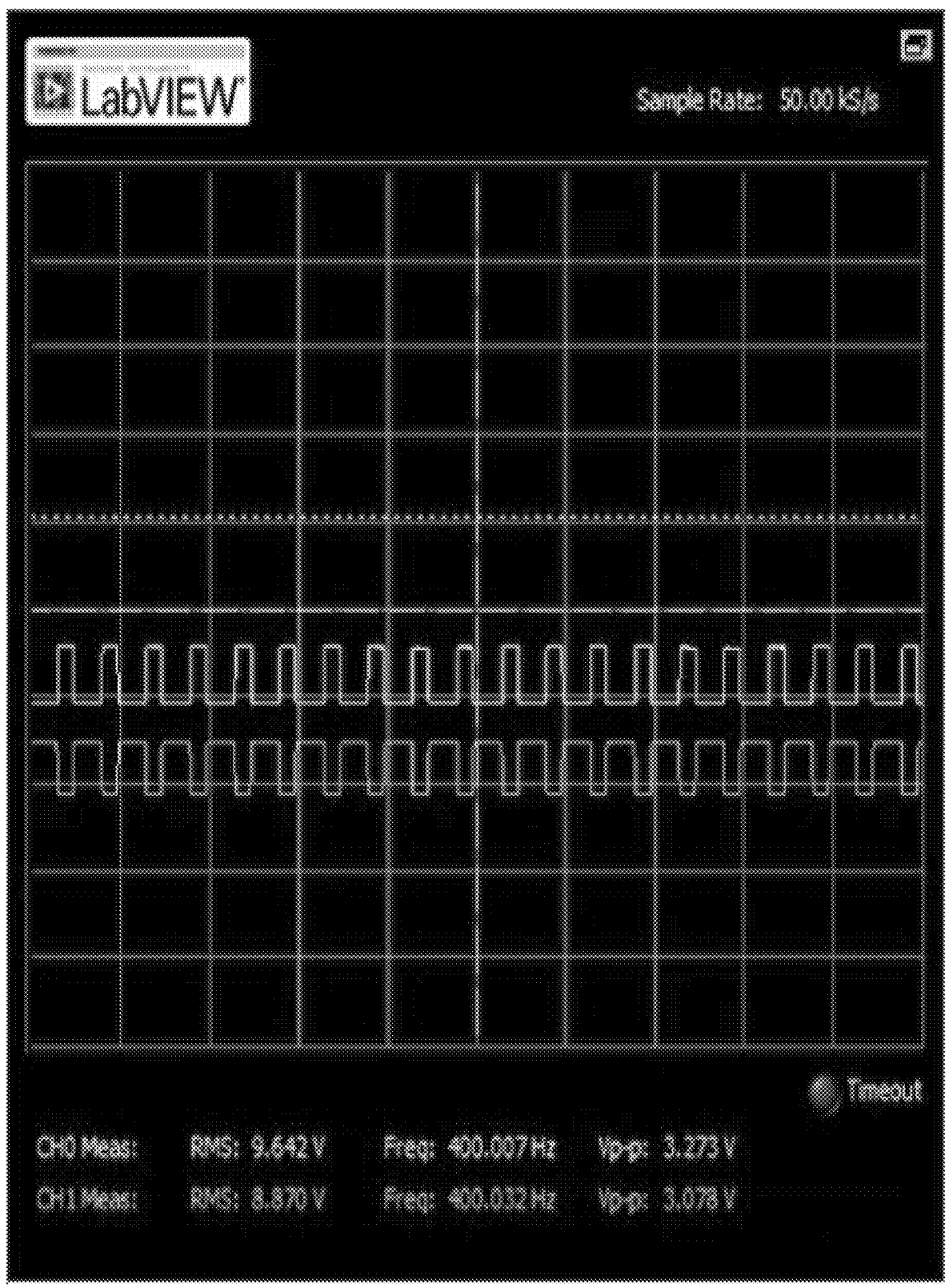

With respect to physical attack implementation, the attack circuit is shown in FIG. 20 and the impact is shown in FIGS. 21A and 21B. To execute the practical Trojan attack, the following procedure was used:

(1) Use a NAND logic gate inverter IC to modify the PWM waveform from the flight controller's output.

(2) Direct both the original and modified PWM values to a switch.

(3) Connect the switch outputs to the ESCs.

(4) Activate the switch every 4 seconds, simulating the hardware Trojan's trigger-payload mechanism.

Figure 5A:
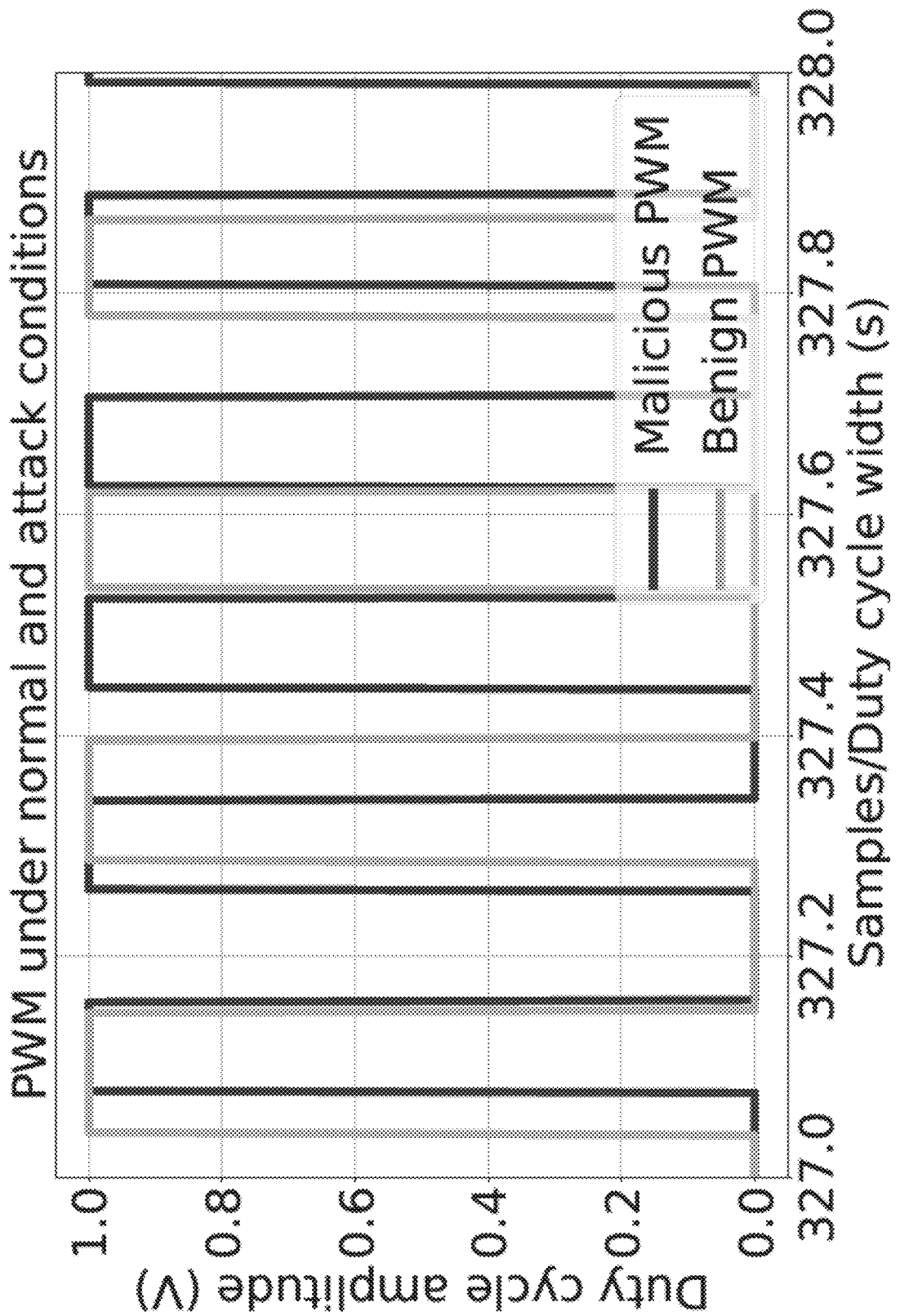
FIGS. 5A-5D show results of a simulated Trojan-based PWM attack with random PWM alteration.
Figure 5B:
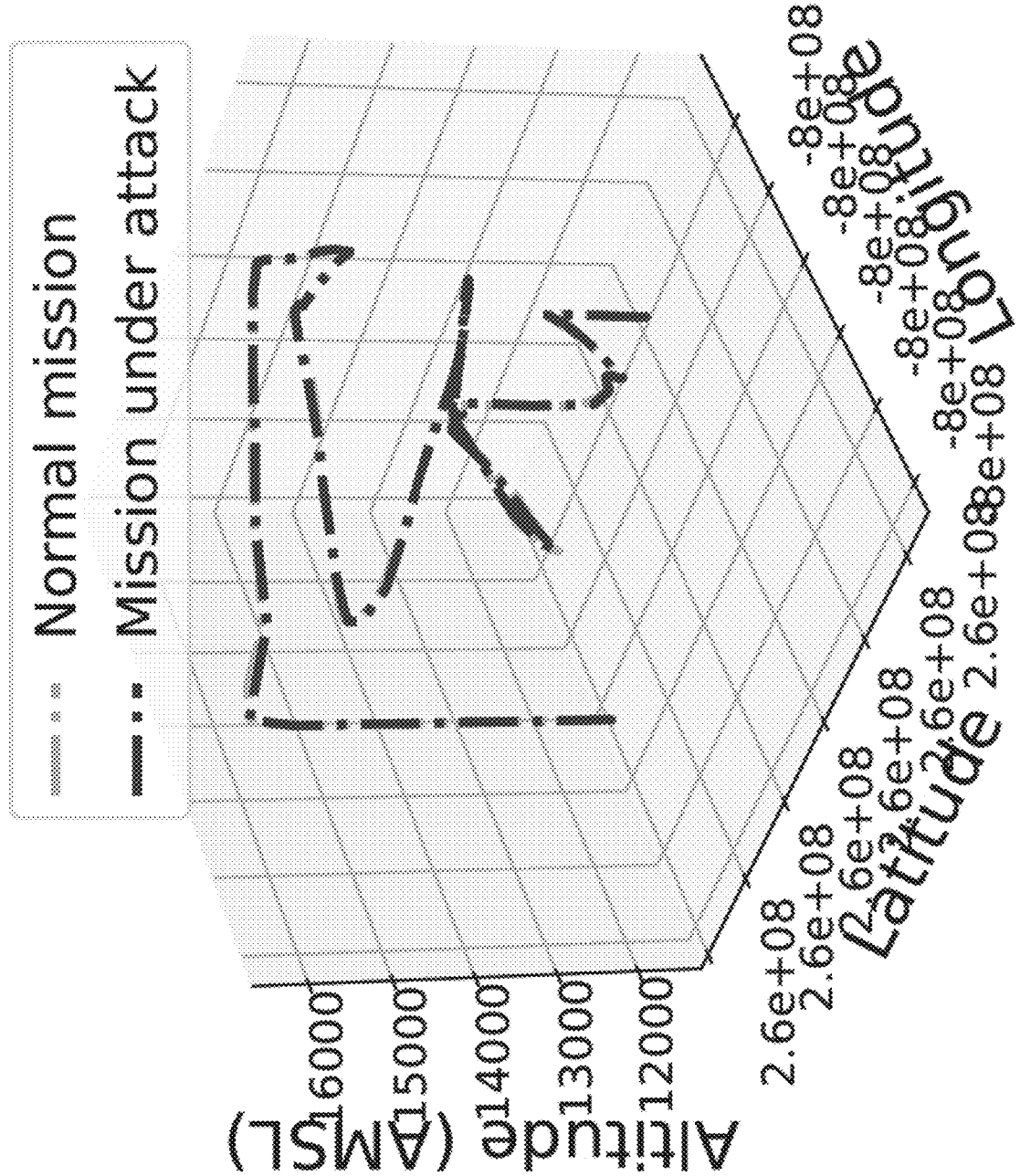
Figure 5C:
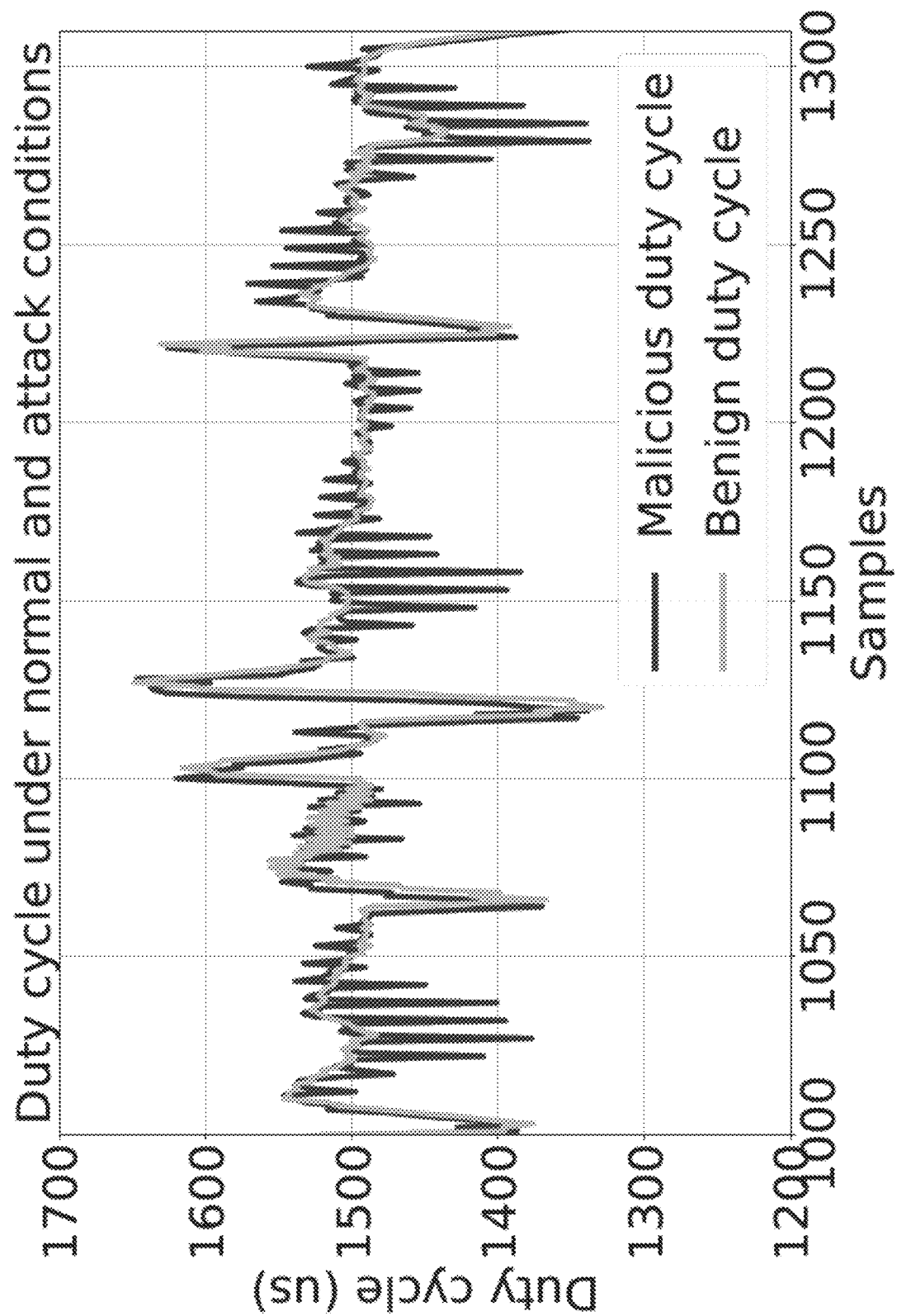
Figure 5D:
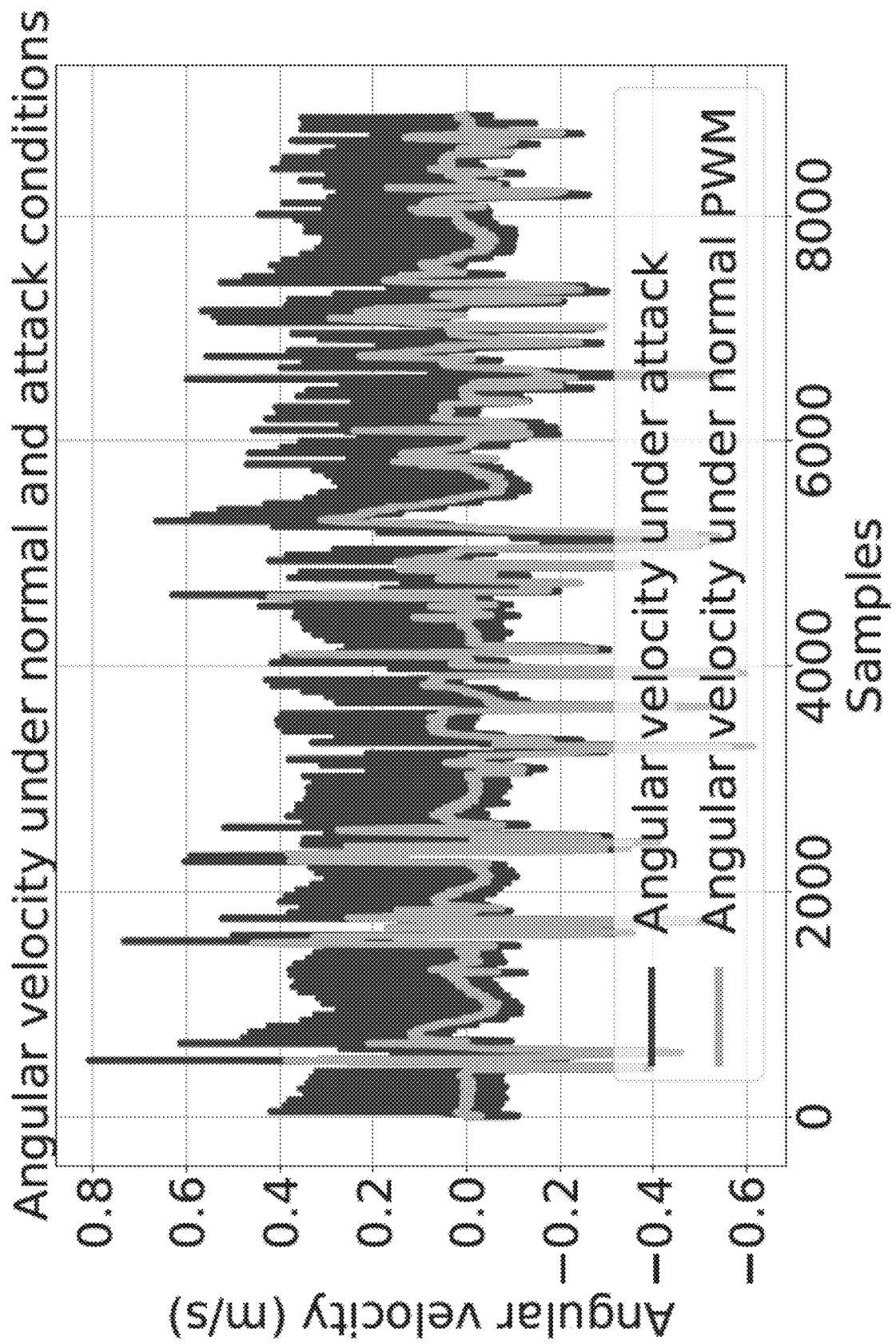
Figure 6A:
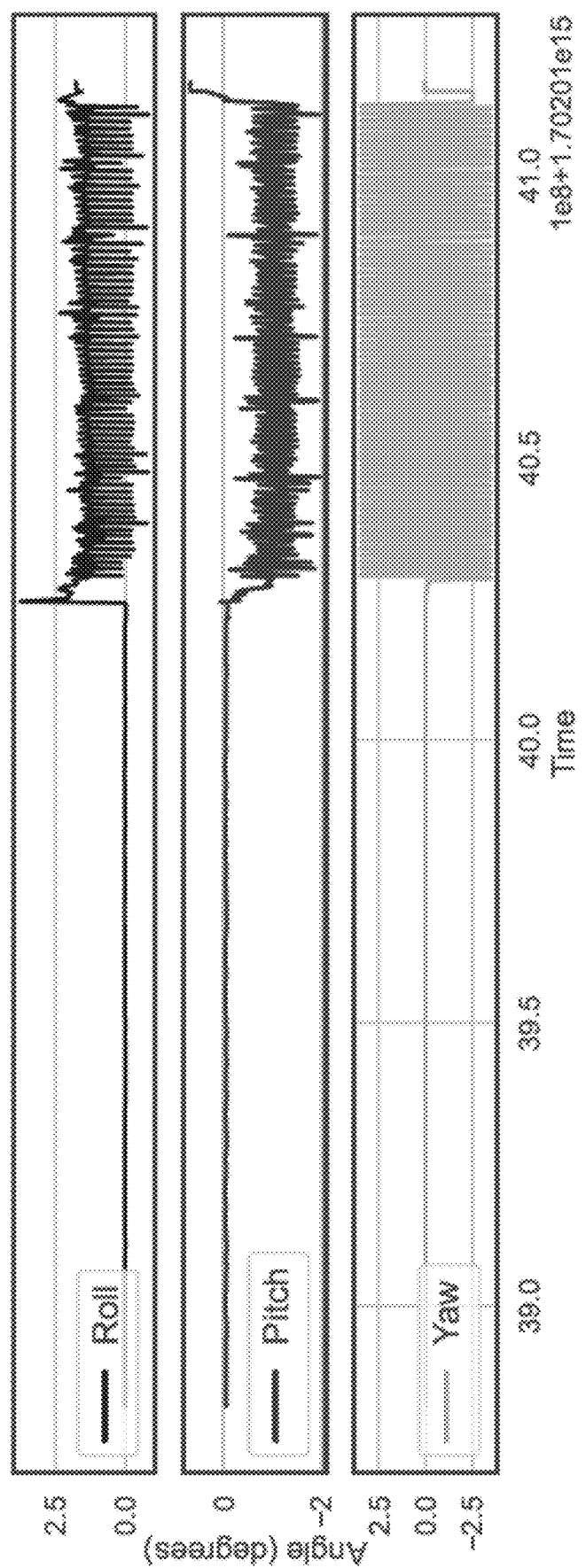
FIGS. 6A and 6B show results of altering the duty cycle value by 500 units in a simulated Trojan-based PWM attack.
Figure 6B:
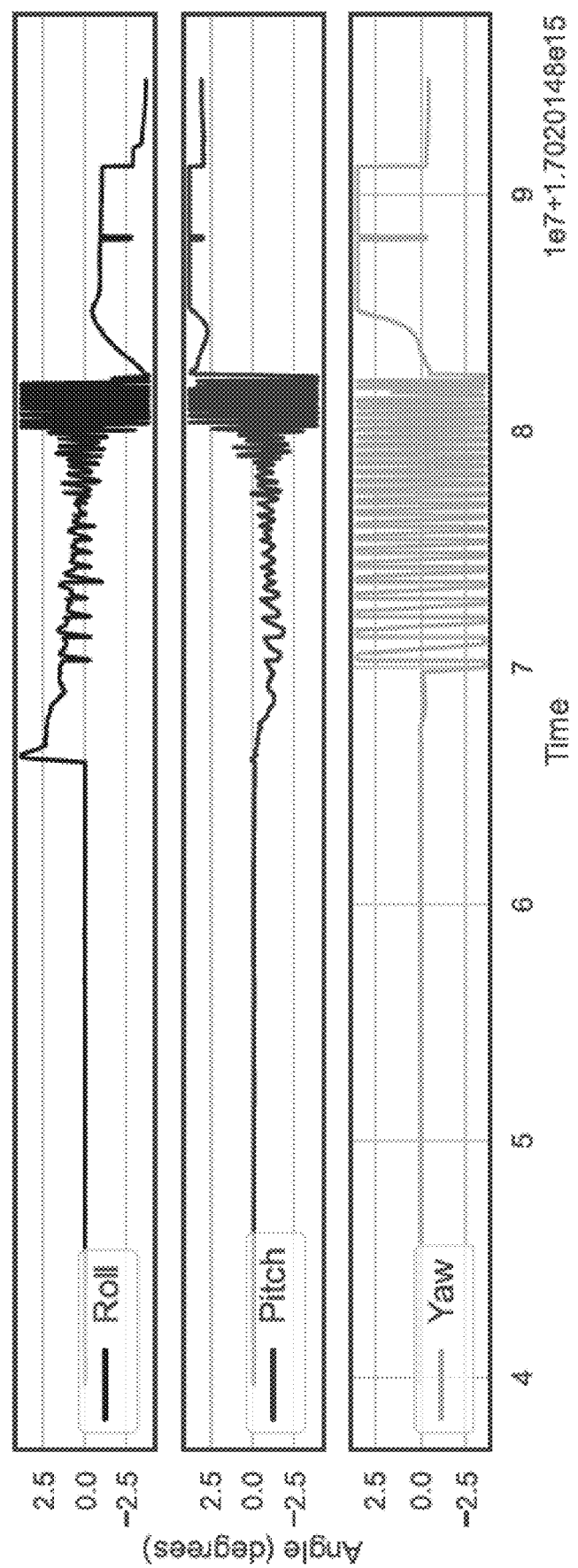

With respect to simulated attack implementation, HT attacks were simulated with two characteristics: (i) random alteration of PWM values for the motors; and (ii) targeted alteration in PWM values with an incremental offset, ultimately crashing the drone. FIG. 5A shows the stealthiness of attack (i) impacting the UAV's duty cycle, angular velocity, and causing unhealthy vibrations as seen in FIG. 5C and FIG. 5D, which may result in increased motor wear and compromised mission outcomes. As FIG. 5B illustrates, a UAV might complete its mission without flagging the intrusion. For (ii), the attack applies a large, oscillating offset to the PWM signals, incrementing or decrementing by 500 units in FIG. 6A, and 525 units in FIG. 6B with each iteration to induce an increment in the offset. The impacts are shown in FIG. 6A, which causes increased system vibration, but still the mission is carried out, and FIG. 6B, where the UAV crashes.

Random alteration of PWM values for the motors, subtly impacting the UAV's duty cycle and angular velocity, can result in unhealthy vibrations and increased wear on the motors, as seen in FIGS. 5C and 5D. A UAV might complete its mission under such conditions without triggering internal fail-safes or flagging the intrusion, as illustrated in FIG. 5B. With respect to targeted alteration in PWM values with incremental offsets, potentially leading to a UAV crash the alteration amount (denoted by the attack parameter ($\Delta$)) was varied to observe different outcomes. With an incremental offset, increased vibrations within the system occurred but not enough to halt the mission, as shown in FIG. 6A. Conversely, a larger offset of Δ=525 units in FIG. 6B resulted in a UAV crash.

It's critical to note that the attack parameter (Δ) directly correlates with the impact severity. A minimal Δ may cause the UAV to experience only slight disruptions, whereas a moderate Δ can lead to operational instability. As demonstrated, a significant Δ leads to a loss of control and subsequent crash. This shows that the impact of PWM signal manipulation is a function of both the magnitude of alteration and the operational context, including flight conditions and environmental factors. Thus, the attack model, as summarized in Equation 8 and 9, albeit appearing simplistic, can yield a spectrum of operational consequences, substantiating the complex nature of such cyber-physical attacks.

Example 2

ConFIDe was implemented on an S500 Pixhawk 2.4.8 quadcopter UAV, powered by a 32-bit ARM CortexM4 processor and running the NuttX Real-Time Operating System (RTOS). For navigation, the UAV was equipped with a Neo-M8N GPS and an integrated compass. Additionally, an ESP8266-NodeMCU WiFi module was integrated for telemetry purposes, facilitating communication with ground control at a baud rate of 921600.

ConFIDe utilized two datasets for detection: 1) flight control data encompassing modules like control, estimator status, and position attributes; and 2) post-routine execution PWM outputs. The Pymavlink Python library was leveraged for intra-UAV communication. This library facilitates real-time UAV data transfer. MAVlink connection was initiated, and data was continuously fetched. PWM outputs were analyzed with varied pulse durations. For real-time PWM analysis, the Arduino-Mega2560 was used, employing ArduinoIDE routines for data automation.

For the computational device, an 11th Gen Intel® Core™ i7-1195G7 @ 2.90 GHz with 16.0 GB RAM was used. This 64-bit system processed data from Pymavlink and Arduino and managed ConFIDe's training and classification.

ConFIDe's effectiveness was validated theoretically using synthetic attack data and practically via a Trojan emulation of UAV hardware. Its performance was evaluated using standard metrics: (1) accuracy, representing the ratio of correct identifications to all points; (2) precision, indicating the fraction of correct classifications out of all classified instances; (3) recall, denoting the fraction of correctly identified cases among all instances; and (4) F1 score, which balances recall and precision. The ROC-AUC score was used to assess the model's ability to differentiate between classes. The higher the AUC, the better the model's discriminatory power. The following nine questions (Qs) guided the evaluation process, and the details of these nine Qs are presented in Examples 3-11, respectively.

Q1: How effectively can ConFIDe perform when different combinations of PWM channels are under attack?

Q2: Is ConFIDe able to detect PWM attacks when the trigger frequency of the HT is varied?

Q3: Is the chosen feature set optimal for training ConFIDe, and what are the effects of using more or fewer features?

Q4: How does ConFIDe compare to other machine learning models?

Q5: What is ConFIDe's computation time?

Q6: Can ConFIDe detect real-time hardware attacks?

Q7: Can ConFIDe detect simulated PWM-based attacks??

Q8: How can removing individual modules affect ConFIDe's performance, and how can this be optimized?

Q9: Can ConFIDe detect common sensor attacks?

Example 3

Figure 10:
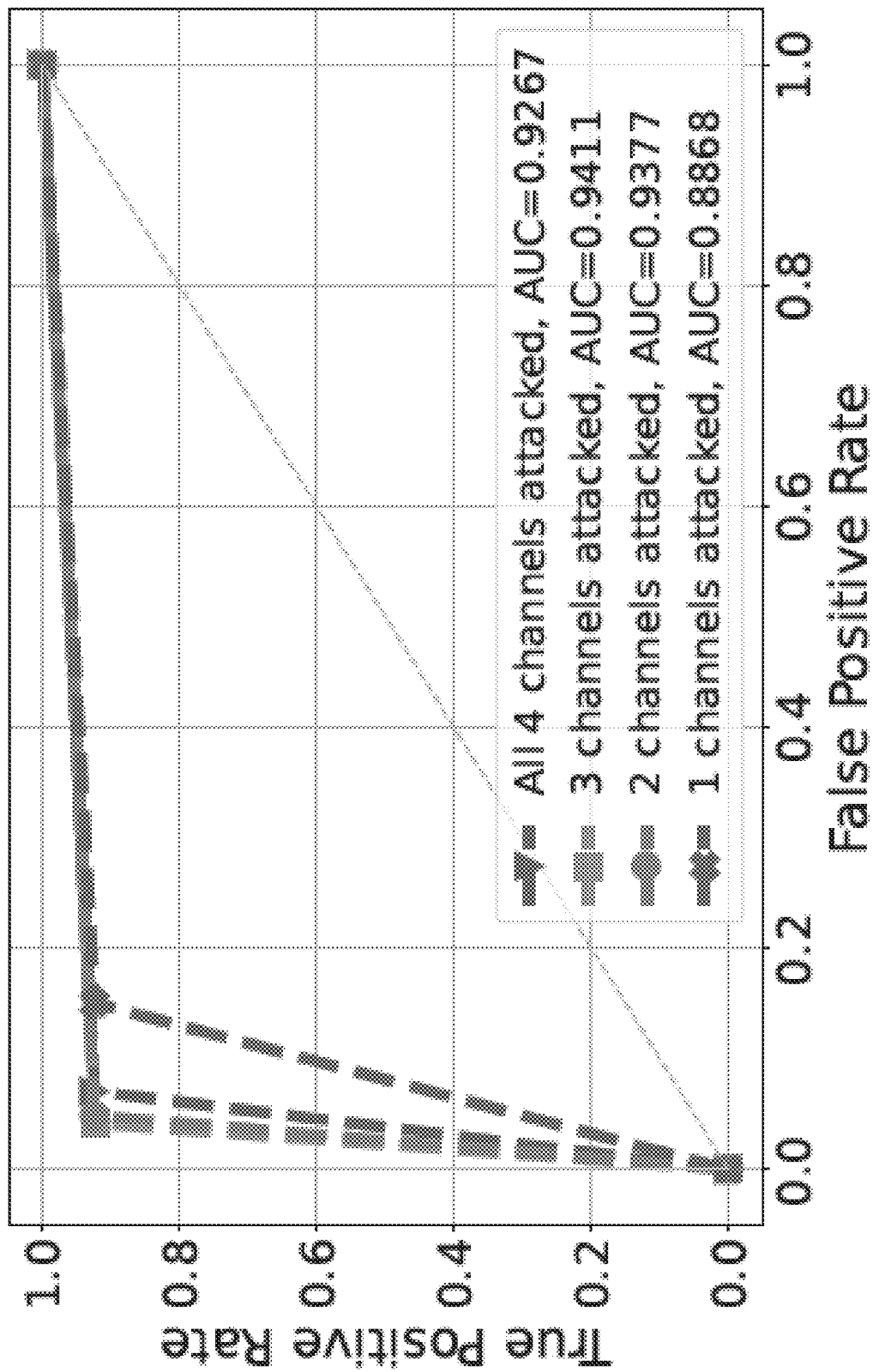
FIG. 10 shows a plot of true positive rate versus false positive rate, showing that performance varies based on the number of attacked channels, with the highest efficacy observed when three channels are simultaneously targeted.

With respect to Q1 (performance evaluation when different combinations of PWM channels are attacked), a quadcopter UAV has four PWM channels, each driving the corresponding brushless direct current (DC) (BLDC) motor. An adversary can carry out a PWM-manipulative HT attack on one, two, three, or all four channels. Further, attacking two and three sets of channels can be carried out in various combinations. The threat model discussed in this application as an example threat model was used. PWM inversion was carried out with a trigger of 25% in the test set to generate synthetic attack data for each possible combination of the channels. The accuracy, F1-score, ROC-AUC score, precision, and recall for all these scenarios are summarized in the table in FIG. 24. Also, FIG. 10 visualizes the ROC-AUC scores for the same. It can be seen that ConFIDe successfully classified the attacks on all different combinations of channels with the highest AUC for a combination of attacks on three channels.

Example 4

Figure 11:
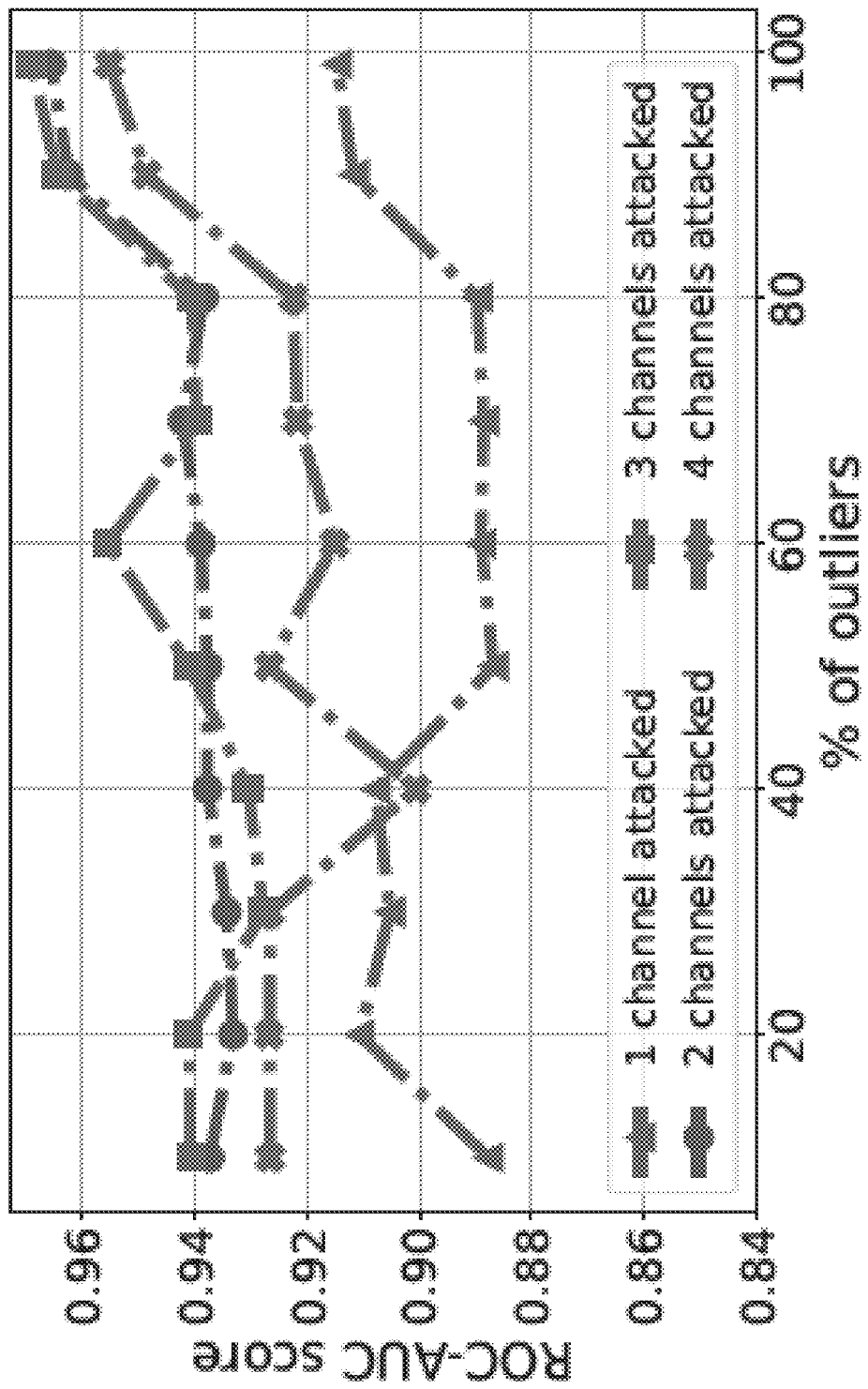
FIG. 11 shows a plot of ROC-AUC (receiver operating characteristic (ROC)-area under the curve (AUC)) score versus percentage of outliers. The performance of a system according to an embodiment of the subject invention was assessed by altering the percentage of outliers in the test set, indicative of Trojan's trigger frequency. The system effectively identified even covert attacks.

With respect to Q2 (performance evaluation when the trigger frequency of the HT attack is varied), an HT attack has a payload (the attack impact), which is launched whenever the trigger is satisfied. An adversary can vary the trigger frequency based on their attack goal. The less frequent the trigger, the stealthier the attack, and vice versa. Synthetically, this variation in the trigger frequency can be represented by varying the number of outliers or the attack data in the test set. For example, in a test set of 100,000 benign samples, an HT triggered 10% of the time would correspond to 10,000 malicious samples and 90,000 benign ones. ConFIDe's performance was evaluated across various trigger frequencies and channel combinations, generating multiple test sets with varying numbers of malicious PWM samples. The results, visualized in FIG. 11, demonstrate that ConFIDe effectively detected even stealthy attacks with less frequent triggers. Notably, the detection accuracy remained robust even at lower trigger frequencies, a scenario typically challenging for IDS systems due to reduced attack signatures.

Example 5

Figure 12A:
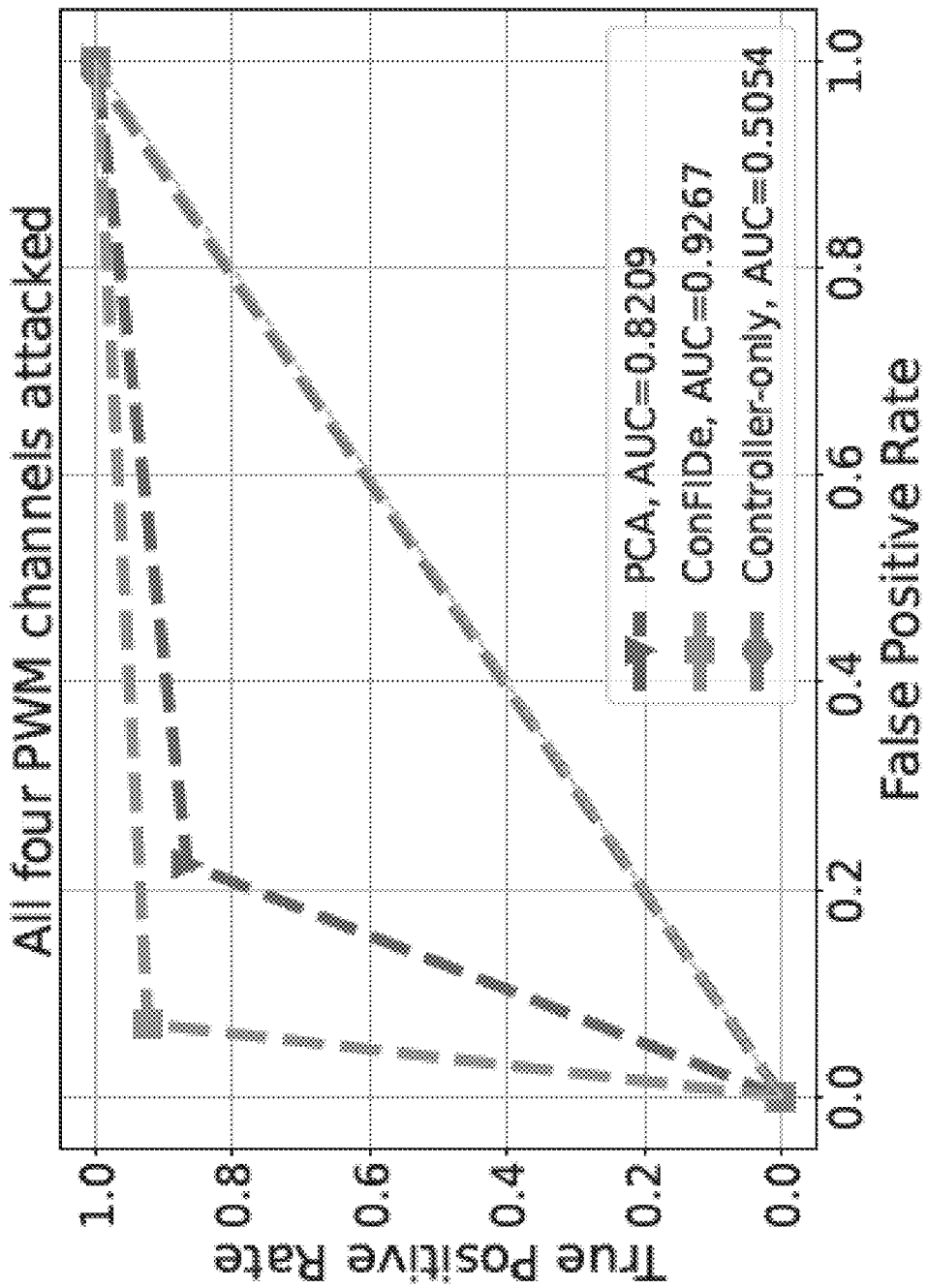
FIGS. 12A-12C show plots of true positive rate versus false positive rate, providing a performance comparison of a system according to an embodiment of the subject invention (which can be referred to herein as "Confide" or "ConFIDe") with models trained on different feature sets (i.e., principal component analysis (PCA)-based and controller-only models).
Figure 12B:
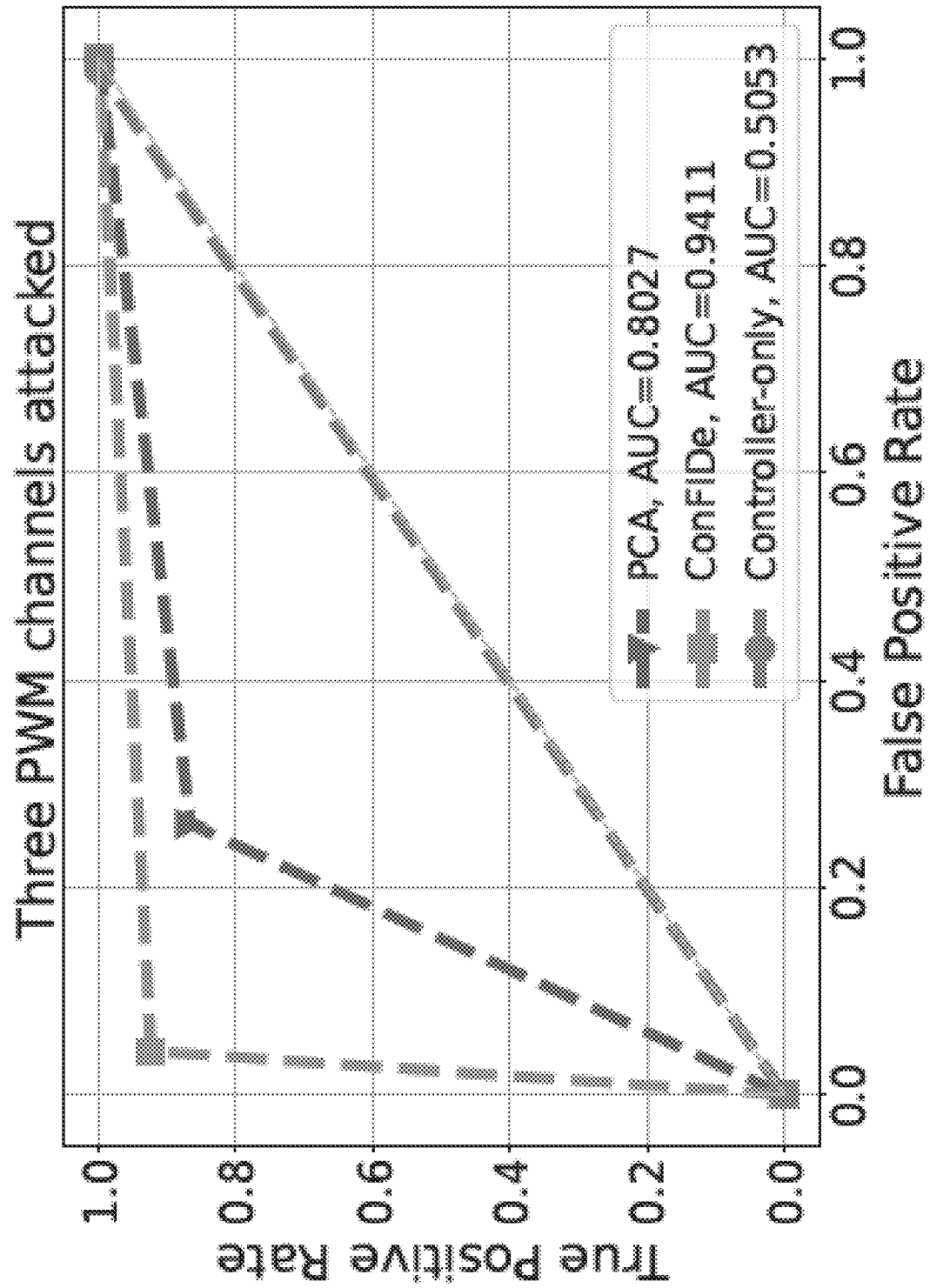
Figure 12C:
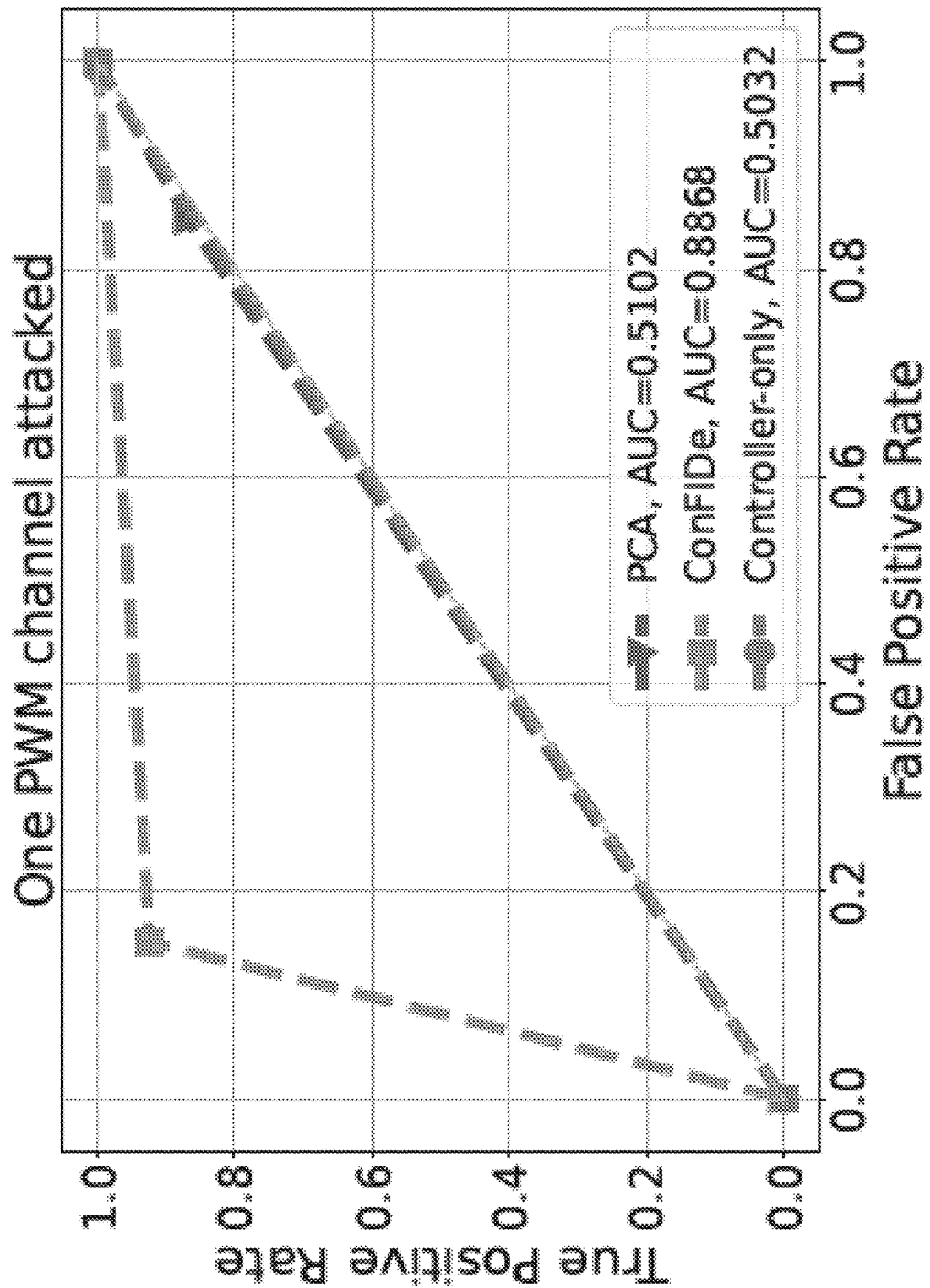

With respect to Q3 (performance comparison of ConFIDe with different sets of features), ConFIDe was trained on a set of features pertaining to the flight control in a UAV. The initial feature set, comprising 33 pivotal features, was carefully chosen based on their relevance to UAV flight control dynamics and their potential impact on identifying anomalous behaviors. These features encompass control inputs, positional accuracy, GPS data, and core motion angles, among others, which are crucial for the real-time detection capabilities of ConFIDe. These features were manually filtered out from the flight logs based on the documentation of the working mechanism of the flight controller. The number of features accounts for the dimensionality of a model. Higher dimensionality can often result in models being unable to distinguish between classes adequately. To validate the feature selection for ConFIDe, two other AE models were trained with a set of features obtained from principal component analysis (PCA) on the flight logs, accounting for 95% of the variance, and a set of features from the controller module of the flight controller, respectively, and their performances were compared for different combinations of channels attacked. The ROC-AUC scores representing the performance of each of these models can be seen in FIGS. 12A-12C. Referring to FIGS. 12A-12C, ConFIDe outperformed both the models when all four, three, and/or one channel(s) was attacked.

Example 6

Figure 13:
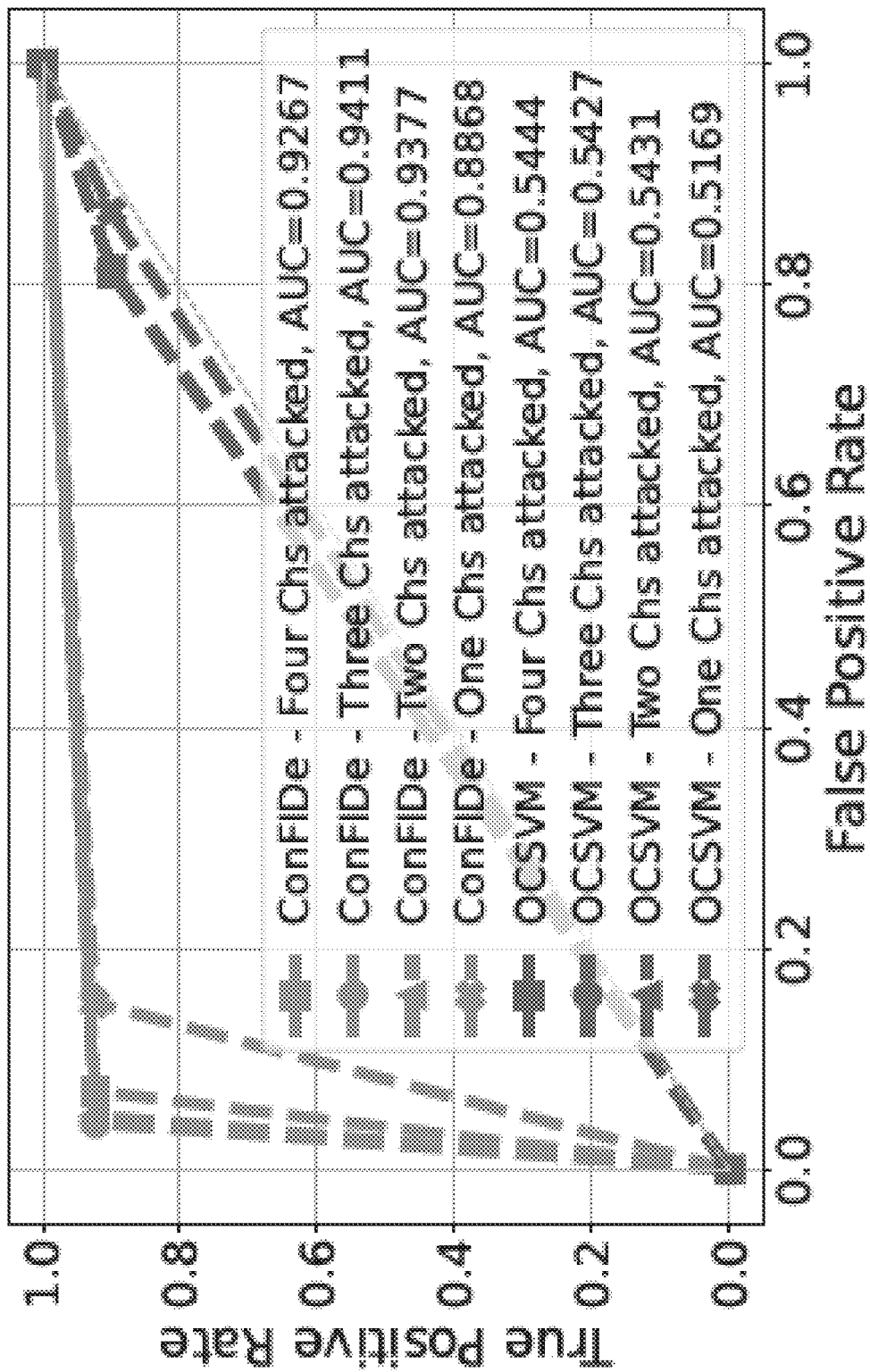
FIG. 13 shows a plot of true positive rate versus false positive rate, showing a performance evaluation of a system according to an embodiment of the subject invention. The ConFIDe system outperformed one-class support vector machine (OCSVM) due to its ability to capture the non-linear relationship between UAV control features, as OCSVM falls short in this regard.

With respect to Q4 (comparative effectiveness of ConFIDe with other machine learning (ML) models), AE-based ConFIDe's performance was compared with other ML models to determine its effectiveness. One such algorithm is OCSVM, widely used in anomaly detection applications. This comparison can provide insights into the strengths and weaknesses of each technique. OCSVM was implemented at the third phase of ConFIDe (box "c" in FIG. 8) and the performance was compared with AE implemented in the third phase. As shown in FIG. 13, ConFIDe outperformed OCSVM due to OCSVM's inability to capture the non-linear relationship between UAV control features. While OCSVM is adaptable with radial basis function (RBF) for non-linear scenarios, the findings show that ConFIDe exhibits superior performance in the context of UAV security. This is due to its deep learning architecture, which effectively captures and analyzes the intricate patterns and dependencies characteristic of UAV control data. This discrepancy can be attributed to the unique challenges of UAV control signals, which exhibit highly complex and dynamic behaviors. The potential limitations of OCSVM in this context stem from its reliance on a predefined kernel function to transform the input space, which might not fully encapsulate the intricate dynamics of PWM signals in UAVs. Moreover, AEs can outperform traditional SVMs offering higher accuracy and reliability.

Example 7

With respect to Q5 (computation time for ConFIDe), the time it takes for ConFIDe to make an attack or benign prediction on each sample was recorded. The total computation time is the sum of the time taken to reconstruct the incoming sample by the AE and the time taken by the classifier phase. These times were calculated for each combination of the channels attacked. Hence, for one channel under attack, ConFIDe detected all the malicious samples in 2.42 milliseconds (ms). Similarly, two, three, and four channels under attack took 2.56 ms, 2.56 ms, and 2.98 ms, respectively. On average, the time ConFIDe took to predict whether an incoming sample is benign or malicious was approximately 2.63 ms. It is noted that in an in-flight system, this IDS can be implemented using field programmable gate array (FPGA) technology within a trusted computing base (TCB), which can reduce the detection latency and increase the computational speed significantly. It is also noted that implementing ConFIDe on an FPGA directly within the system's secure processing framework does not introduce new supply chain vulnerabilities. This approach capitalizes on the inherent capabilities of FPGAs for high-speed processing while ensuring system integrity through a trusted configuration and verification process. The implementation can be carefully designed to utilize the FPGA's flexibility and speed in a secure manner, effectively strengthening the system's defenses without complicating the supply chain.

Example 8

With respect to Q6 (practical performance evaluation of ConFIDe), multiple experiments were carried out on real-life UAVs. The HT attack was emulated using an inverter IC. In total, two data sets were formed in real-time: an attack data set with channel 1's PWM values attacked (20 samples); and a routine operation data set (10 samples). After receiving the flight control data in real-time, ConFIDe activated the classification module. It was seen that ConFIDe correctly classified all 20 of the attack samples in real-time. Moreover, all ten of the routine samples (benign) were also correctly classified. For both cases, the number of false negatives was zero, achieving 100% accuracy on practical implementation.

Example 9

Figure 15:
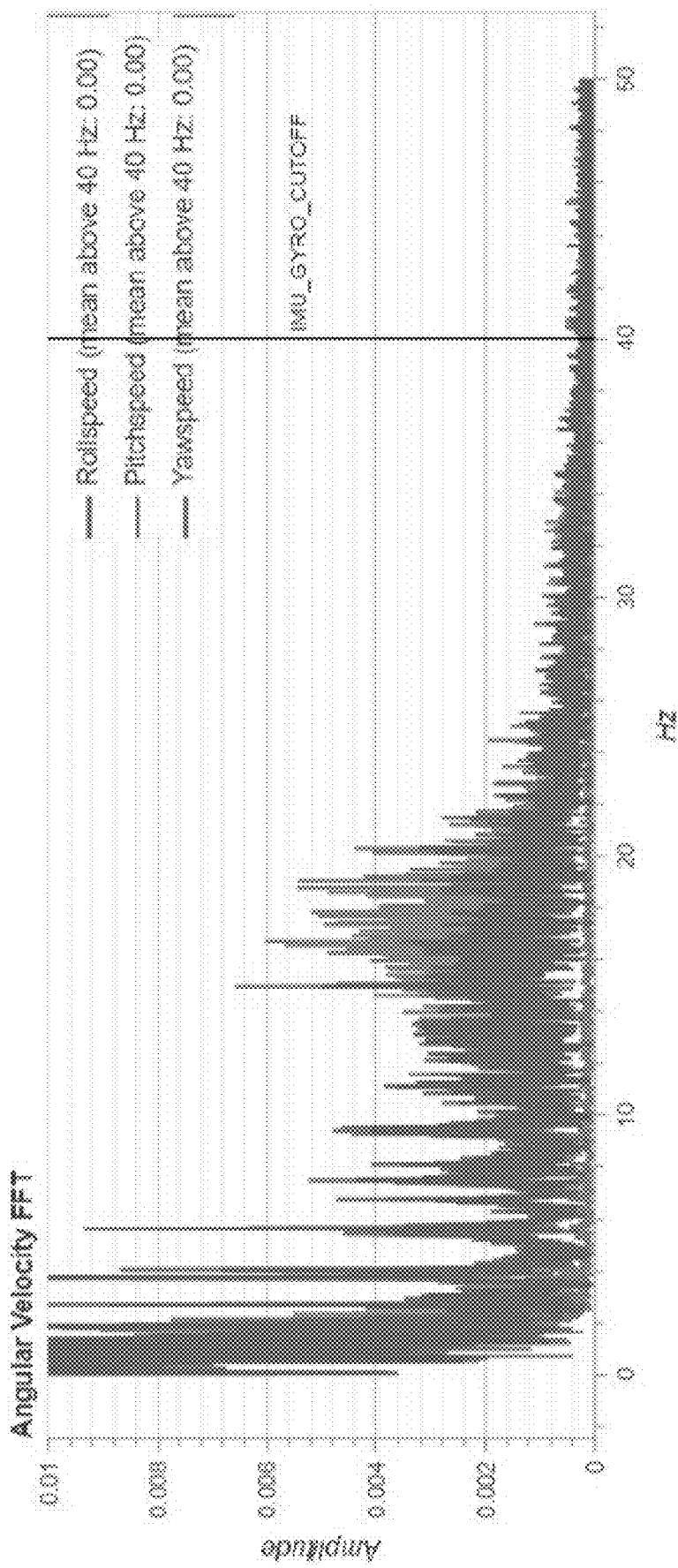
FIG. 15 shows a plot of amplitude versus frequency (in Hertz (Hz)), showing a frequency plot of roll, pitch, and yaw axes from a proportional-integral-derivative (PID) actuator controls during a randomly PWM-altered flight. Peaks above 20 Hz indicate harmful vibrations and potential motor wear.
Figure 16:
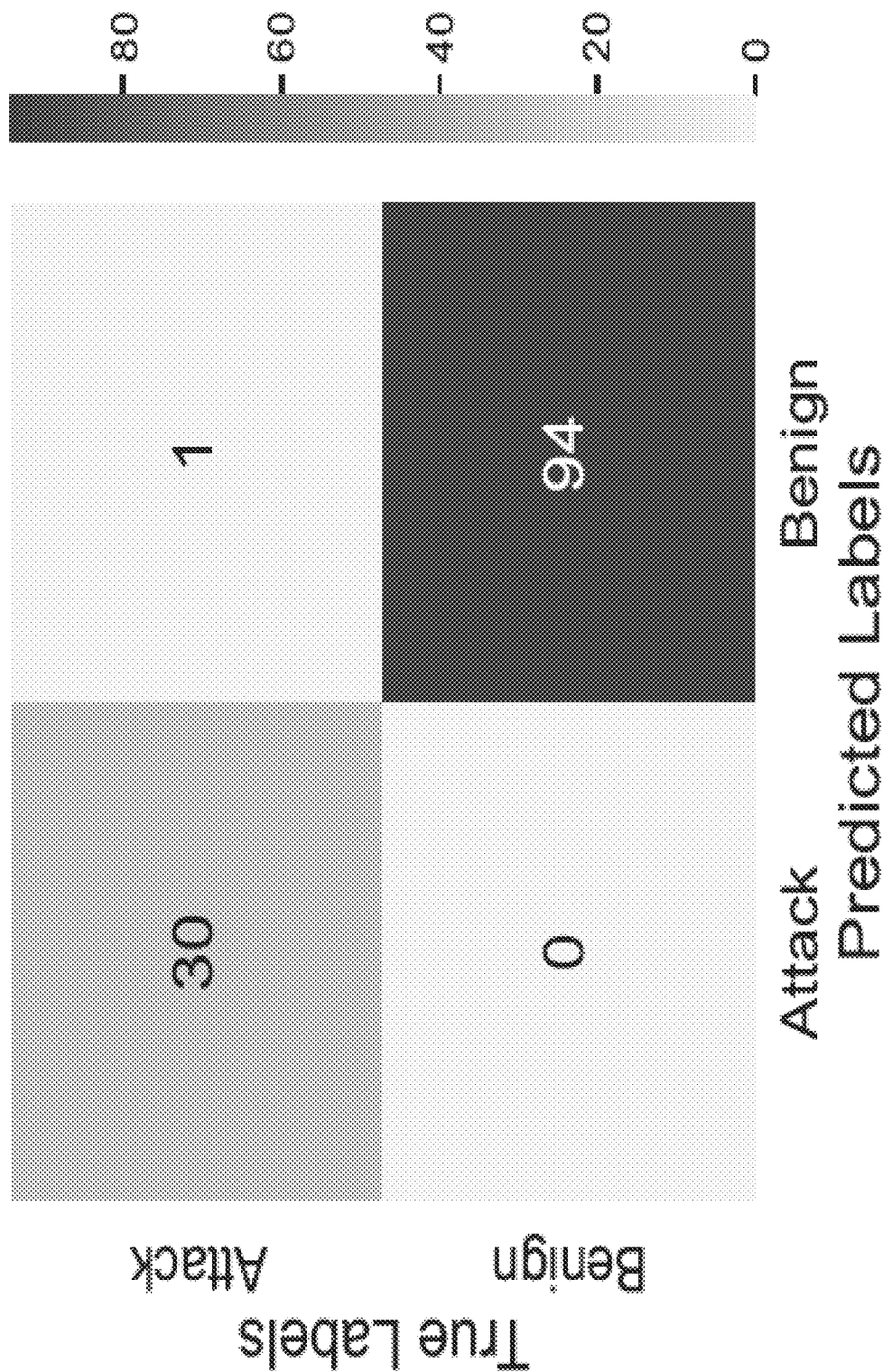
FIG. 16 shows a chart of true labels and predicted labels, showing ConFIDe's performance on a simulated PWM attack. Thirty out of 31 attack samples were correctly predicted with zero false negatives (FNs).
Figure 18A:
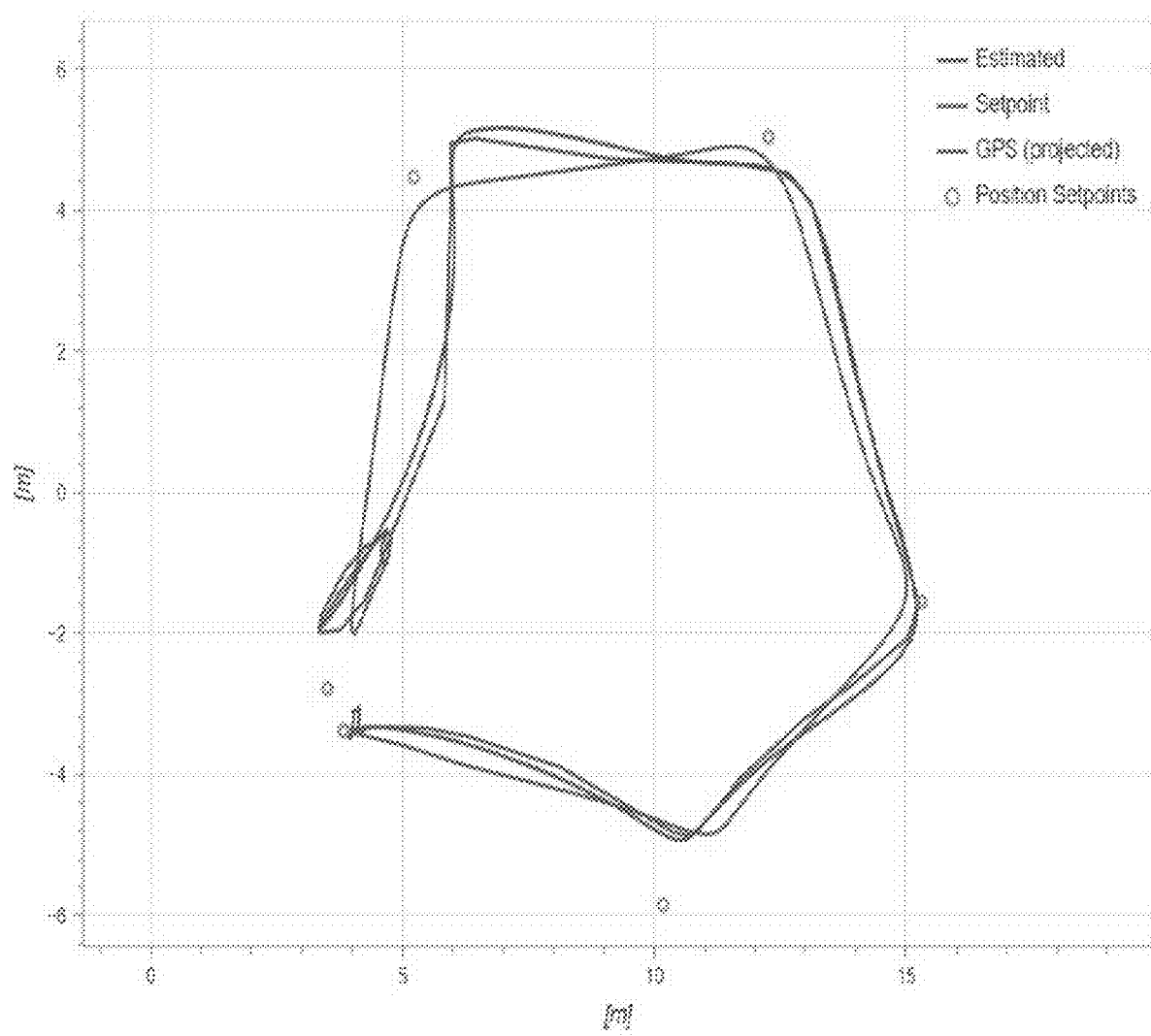
FIG. 18A-18D show data collection trajectories for ConFIDe.
Figure 18B:
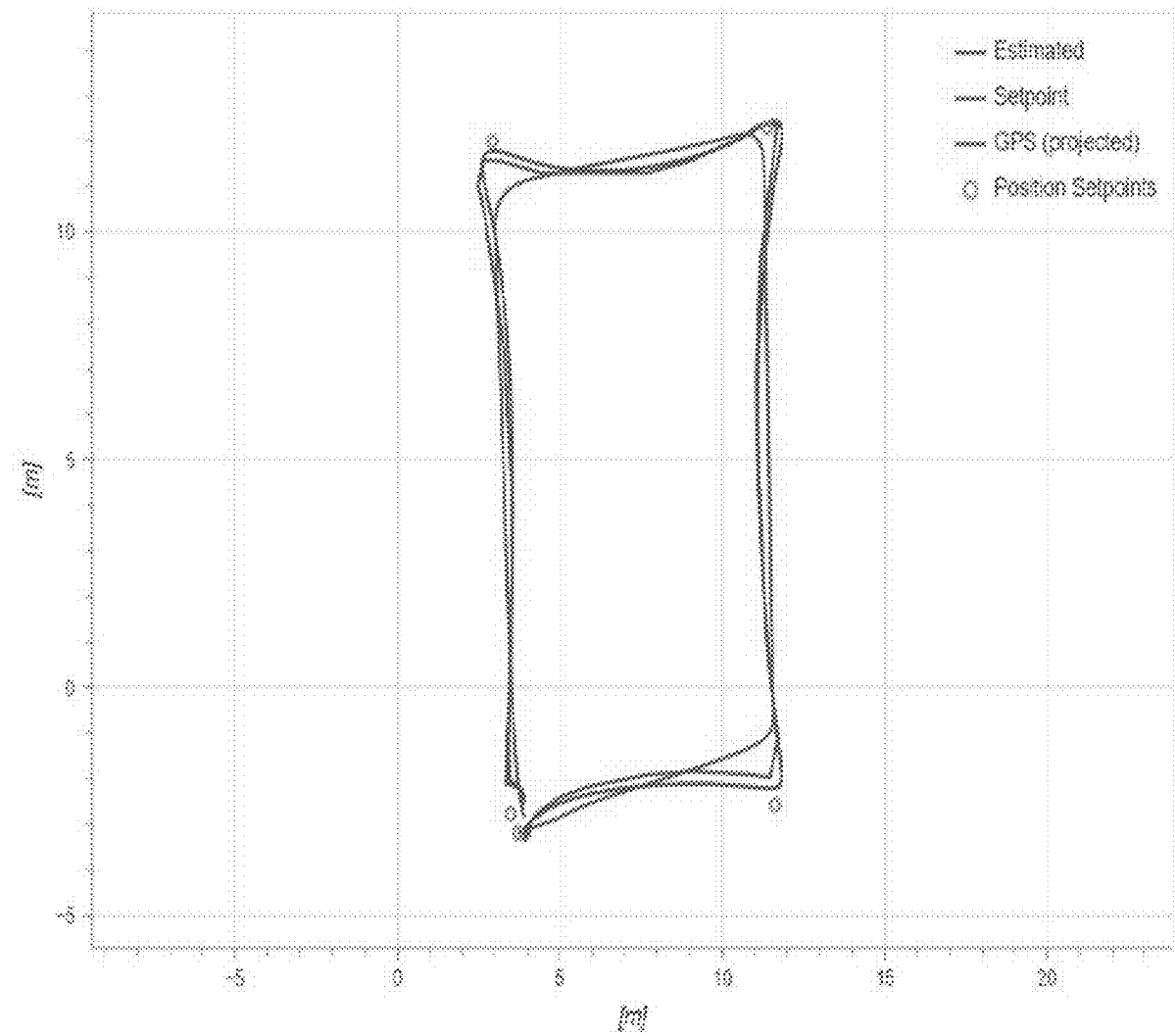
Figure 18C:
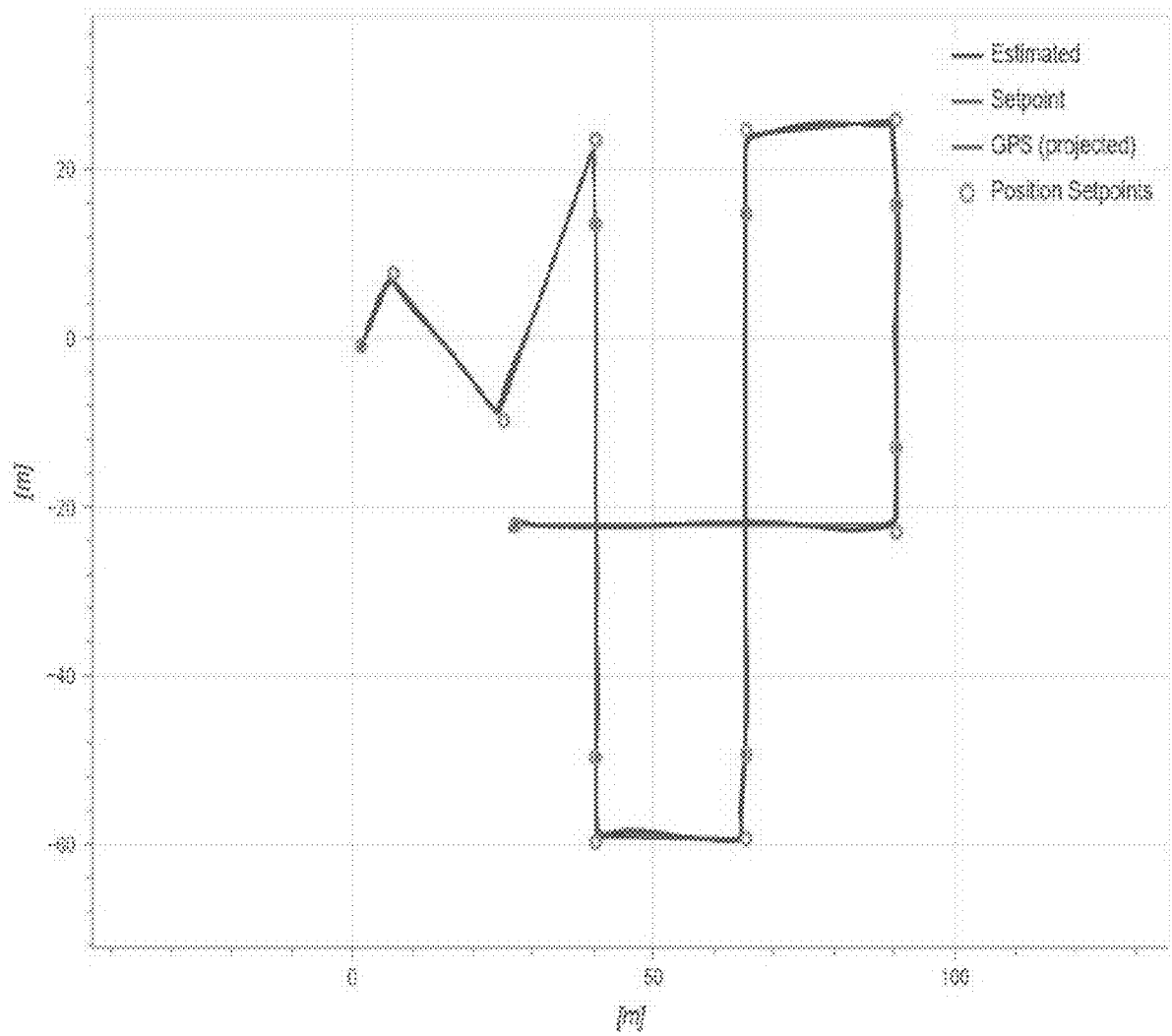
Figure 18D:
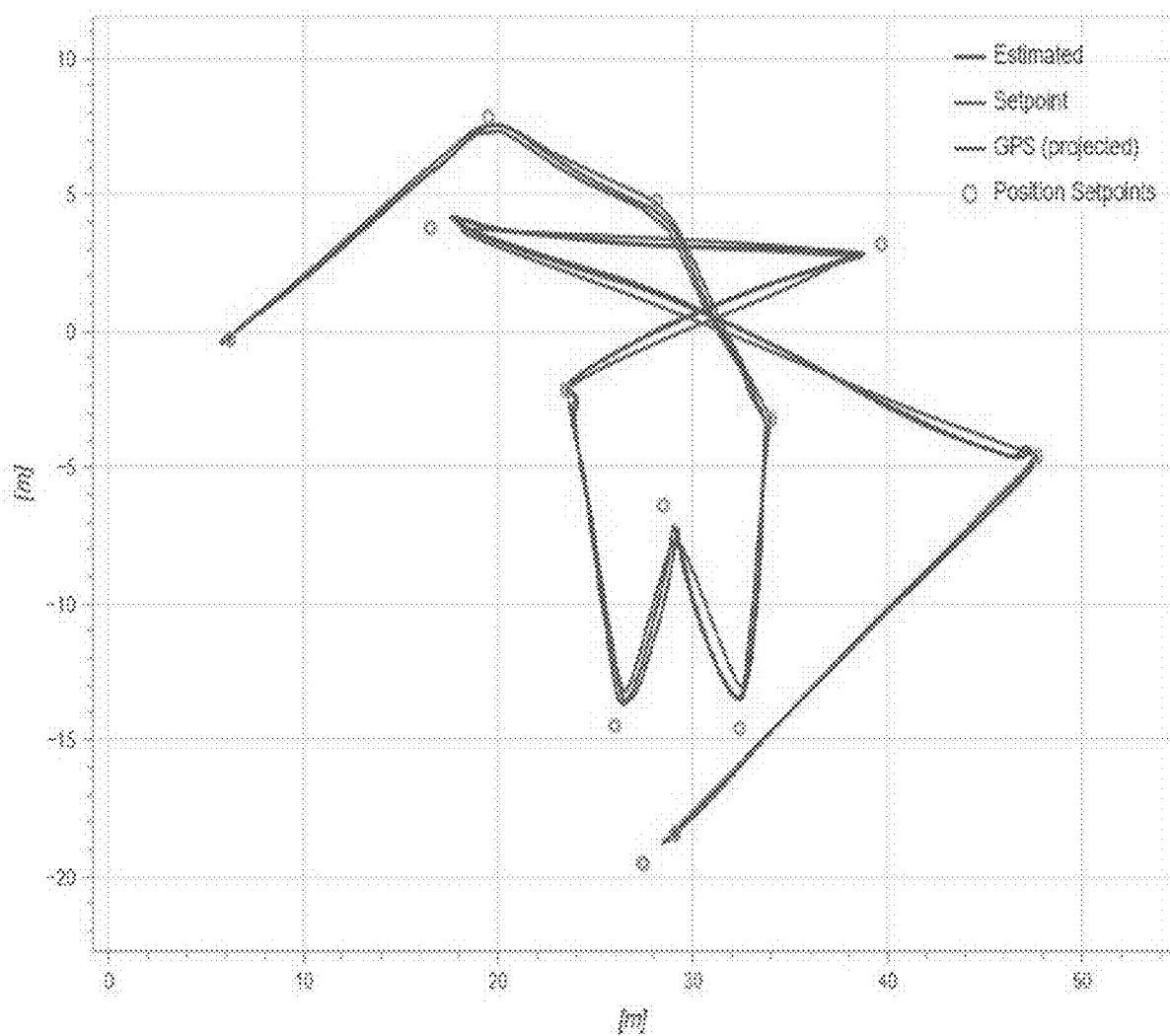

With respect to Q7 (performance evaluation of ConFIDe under simulated attacks), t PWM-altering attacks were simulated through firmware modification on PX4 firmware as entailed in Example 1 where the PWM output for motors 1 and 2 is changed in a trigger-payload fashion, altering the duty cycle of the PWM signal. Despite high vibration in the system, as shown in FIG. 5D, this attack went undetected as no failsafe was internally triggered by the system. Nonetheless, ConFIDe detected 30 out of the 31 attack samples with an accuracy of 99.2% and a ROC-AUC score of 98.38% with one false positive and zero false negatives as illustrated in the confusion matrix in FIG. 16. The implications of such attacks extend beyond immediate threats. FIG. 15 shows the actuator controls' frequency peaks exceeding 20 Hz, indicating detrimental vibrations. These not only affect drone performance but also cause motor wear and tear. ConFIDe's ability to detect these anomalies highlights its effectiveness in identifying firmware manipulations that can silently degrade UAV hardware health.

Example 10

Figure 14:
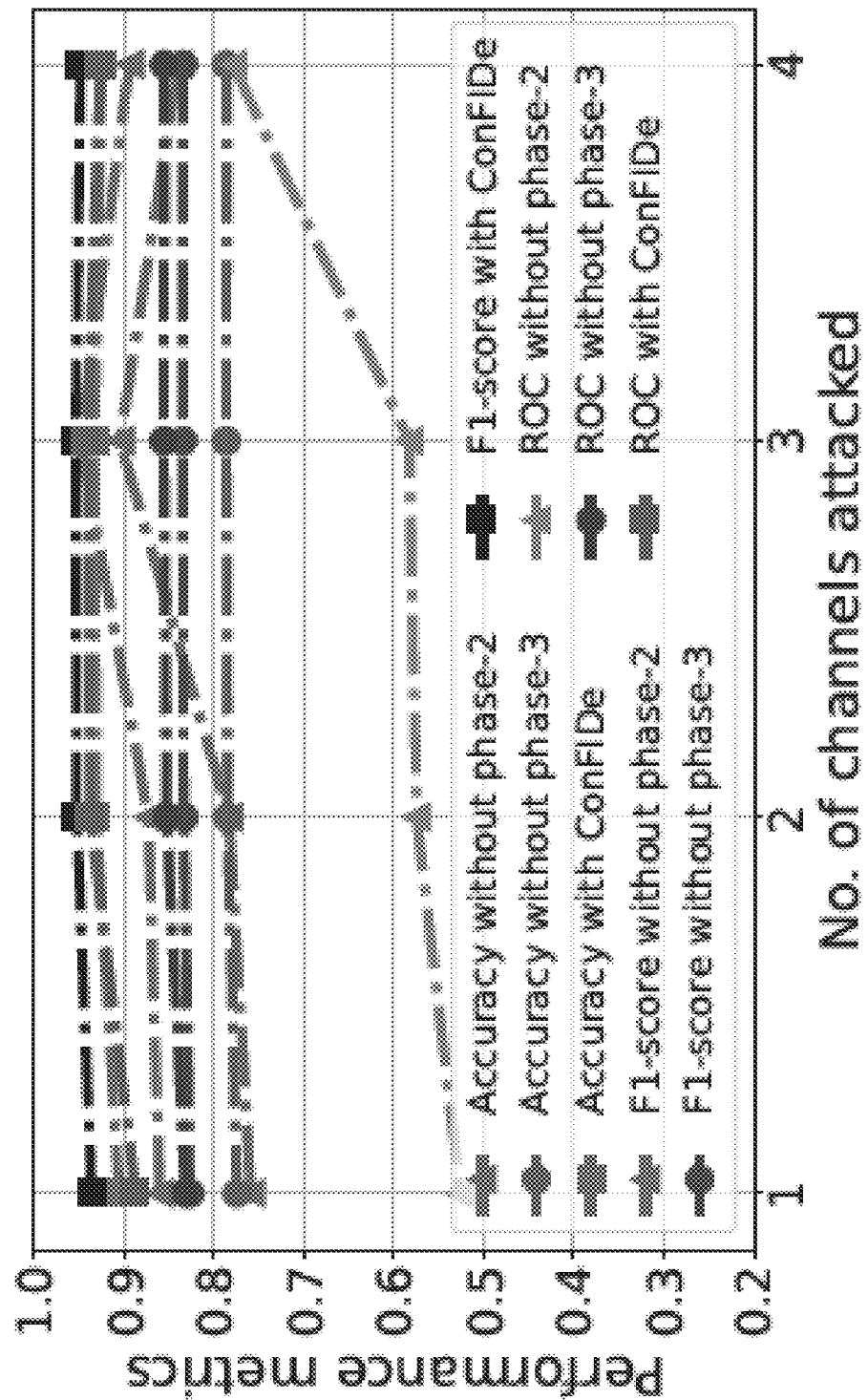
FIG. 14 shows a plot of performance metric versus number of channels attacked, showing results from an ablation study evaluating the performance of individual ConFIDe modules under various combinations of attacked channels, which consistently showed ConFIDe outperforming other methods with the highest scores.

With respect to Q8 (impact of eliminating individual modules on ConFIDe's performance), to thoroughly assess ConFIDe's overall performance and the contribution of its components, an ablation study comprising two parts was conducted. This study aimed to scientifically analyze the impact of removing key elements within ConFIDe, and the performance degradation resulting from these changes was evaluated. This approach enabled a better understanding of each component's importance and effectiveness in intrusion detection. The first part involved removing phase 2 (box "b" in FIG. 8), the flight control and PWM mapping. With phase 2 removed, feature engineering techniques were used to design a feature vector for the AE (phase 3). The second part of the ablation study investigated the removal of the AE (phase 3; box "c" in FIG. 8). Because the AE carries out the main detection for ConFIDe, in case of its removal, a threshold was set of MSE of the PWM outputs predicted by the regressor in the flight control and PWM mapping (phase 2) for attack detection. The performance of eliminating these individual modules was evaluated under different combinations of channels attacked. The performance metrics (i.e., accuracy, F1, and ROC-AUC scores) are shown in FIG. 14.

ConFIDe (with all phases present) performed better in all the cases, with the highest scores for all performance metrics.

Example 11

Figure 22:
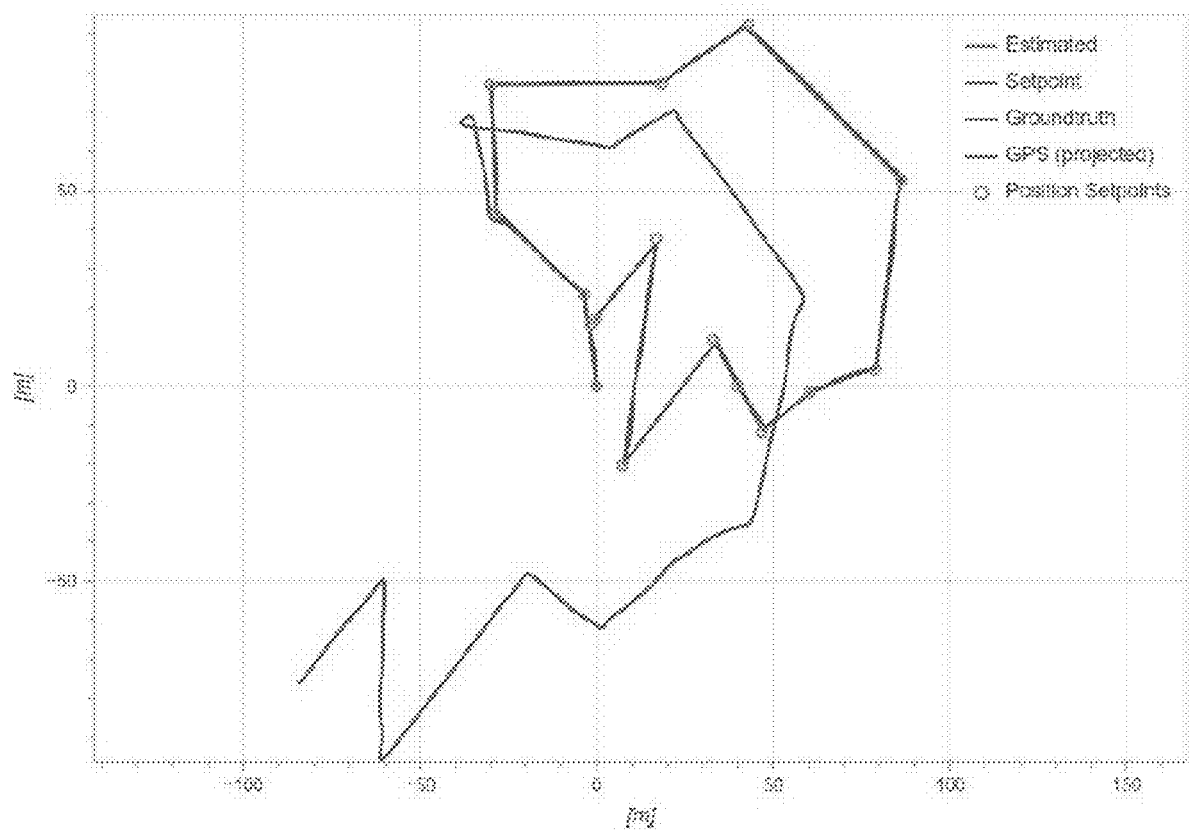
FIG. 22 shows a global positioning satellite (GPS) spoofing attack.

With respect to Q9 (sensor attacks), to ensure ConFIDe offers end-to-end security, it was tested against common sensor attacks such as GPS spoofing. The attack was launched with three different deviation levels—small, medium, and large. The attack goal was to ultimately deviate the UAV from its planned trajectory (see also, Control-fused intrusion detection system for uavs, sites.google.com/view/routine-aware-ids/home; which is hereby incorporated by reference herein in its entirety). The attack graph for the GPS spoofing is shown in FIG. 22. As seen in the table in FIG. 25, ConFIDe had a detection accuracy of up to 100% when the attack became more evident.

After an attack is detected by ConFIDe, mitigation can involve triggering the failsafe so necessary remedial actions may be taken. A possible mitigation strategy can involve imputation of the PWM signals based on the learning of ConFIDe (using a time-series model such as long short-term memory (LSTM) or autoregressive integrated moving average (ARIMA), such that at the point where anomalies are detected, ConFIDe can provide PWM signals to keep the mission going. In the case of UAV security, false positives are considered bearable and better because they trigger a failsafe mechanism that prevents or inhibits a potentially compromised UAV from continuing its mission. The failsafe mechanism can send the UAV back to the base station or take other remedial actions to ensure its data are not compromised (i.e., the mission might fail). Contrarily, a false negative, or the inability to identify an actual breach, can have undesirable effects because it can permit a compromised UAV to carry out its mission, possibly harming people or releasing critical information. Hence, false positives are preferable over false negatives in UAV security because they add extra protection. The false positive threshold in determining security levels depends on the specific use case; for higher data security, a lower false positive rate can be achieved by increasing the detection threshold. Striking a balance between security and operational efficiency is important, as overly conservative thresholds can lead to increased false alarms, potentially disrupting UAV operations unnecessarily.

Moreover, it is to be noted that the control-PWM mapping phase can be a one-time offline deep learning model in the design of ConFIDe. Once this mapping is understood, it can be leveraged to further the ConFIDe IDS design in its detection of any anomalous behavior. Moreover, the training for the AE module (see box "c" in FIG. 8) can also be offline. In many cases, only the testing and classification phase of the AE (see box "c" in FIG. 8) is in real-time.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for control and intrusion detection in an unmanned aerial vehicle (UAV), the system comprising:
   a processor in operable communication with the UAV; and
   a machine-readable medium in operable communication with the processor and having instructions stored thereon that, when executed by the processor, perform the following steps:
   i) receiving flight data of the UAV;
   ii) mapping expected pulse width modulation (PWM) signals based on the flight data;
   iii) training a model using the expected PWM signals to generate an error threshold;
   iv) receiving PWM data of the UAV;
   v) comparing the PWM data of the UAV to the expected PWM signals;
   vi) upon a difference between the PWM data and the expected PWM signals being less than or equal to the error threshold, allowing the UAV to continue its normal operation; and
   vii) upon a difference between the PWM data and the expected PWM signals being greater than the error threshold, determining that the UAV is under attack and causing the UAV to take corrective action.

2. The system according to claim 1, step iii) comprising using a neural network-based autoencoder (AE).

3. The system according to claim 2, the neural network-based AE comprising an encoder network and a decoder network,
   the encoder network being configured to map an input to a feature representation, and
   the decoder network being configured to reconstruct the input from the feature representation.

4. The system according to claim 1, step ii) comprising using a regressor.

5. The system according to claim 4, the regressor being a multi-output Keras regressor.

6. The system according to claim 4, the regressor comprising a plurality of flight control inputs and a plurality of hidden layers, and the regressor being configured to predict expected PWM signals from a plurality of outputs of the UAV.

7. The system according to claim 4, the regressor comprising at least 33 flight control inputs and at least five hidden layers, and the regressor being configured to predict expected PWM signals from at least four outputs of the UAV.

8. The system according to claim 1, the system being configured to successfully detect a jamming attack, a replay attack, a malware or firmware attack, an electromagnetic interference attack, and a physical tampering attack.

9. The system according to claim 1, the instructions when executed further performing the following:
   i-a) after receiving the flight data of the UAV and before mapping the expected PWM signals, pre-processing the flight data,
   step ii) comprising mapping the expected PWM signals based on the pre-processed flight data.

10. The system according to claim 1, further comprising the UAV,
    at one of the processor and the machine-readable medium being disposed on the UAV.

11. A method for control and intrusion detection in an unmanned aerial vehicle (UAV), the method comprising:
    i) receiving flight data of the UAV;
    ii) mapping expected pulse width modulation (PWM) signals based on the flight data;
    iii) training a model using the expected PWM signals to generate an error threshold;
    iv) receiving PWM data of the UAV;

v) comparing the PWM data of the UAV to the expected PWM signals;
vi) upon a difference between the PWM data and the expected PWM signals being less than or equal to the error threshold, allowing the UAV to continue its normal operation; and
vii) upon a difference between the PWM data and the expected PWM signals being greater than the error threshold, determining that the UAV is under attack and causing the UAV to take corrective action.

12. The method according to claim 11, step iii) comprising using a neural network-based autoencoder (AE).

13. The method according to claim 12, the neural network-based AE comprising an encoder network and a decoder network,
the encoder network being configured to map an input to a feature representation, and
the decoder network being configured to reconstruct the input from the feature representation.

14. The method according to claim 11, step ii) comprising using a regressor.

15. The method according to claim 14, the regressor being a multi-output Keras regressor.

16. The method according to claim 14, the regressor comprising a plurality of flight control inputs and a plurality of hidden layers, and the regressor being configured to predict expected PWM signals from a plurality of outputs of the UAV.

17. The method according to claim 14, the regressor comprising at least 33 flight control inputs and at least five hidden layers, and the regressor being configured to predict expected PWM signals from at least four outputs of the UAV.

18. The method according to claim 11, the method being able to successfully detect a jamming attack, a replay attack, a malware or firmware attack, an electromagnetic interference attack, and a physical tampering attack.

19. The method according to claim 11, further comprising:
i-a) after receiving the flight data of the UAV and before mapping the expected PWM signals, pre-processing the flight data,
step ii) comprising mapping the expected PWM signals based on the pre-processed flight data.

20. A system for control and intrusion detection in an unmanned aerial vehicle (UAV), the system comprising:
the UAV;
a processor in operable communication with the UAV; and
a machine-readable medium in operable communication with the processor and having instructions stored thereon that, when executed by the processor, perform the following steps:
i) receiving flight data of the UAV;
ii) pre-processing the flight data to generate pre-processed flight data;
iii) mapping expected pulse width modulation (PWM) signals based on the pre-processed flight data;
iv) training a model using the expected PWM signals to generate an error threshold;
v) receiving PWM data of the UAV;
vi) comparing the PWM data of the UAV to the expected PWM signals;
vii) upon a difference between the PWM data and the expected PWM signals being less than or equal to the error threshold, allowing the UAV to continue its normal operation; and
viii) upon a difference between the PWM data and the expected PWM signals being greater than the error threshold, determining that the UAV is under attack and causing the UAV to take corrective action,
step iv) comprising using a neural network-based autoencoder (AE),
the neural network-based AE comprising an encoder network and a decoder network,
the encoder network being configured to map an input to a feature representation,
the decoder network being configured to reconstruct the input from the feature representation,
step iii) comprising using a multi-output Keras regressor,
the regressor comprising a plurality of flight control inputs and a plurality of hidden layers, and the regressor being configured to predict expected PWM signals from a plurality of outputs of the UAV,
the system being configured to successfully detect a jamming attack, a replay attack, a malware or firmware attack, an electromagnetic interference attack, and a physical tampering attack.

* * * * *